United States Patent
Hejna, Jr.

(10) Patent No.: US 7,100,188 B2
(45) Date of Patent: Aug. 29, 2006

(54) METHOD AND APPARATUS FOR CONTROLLING TIME-SCALE MODIFICATION DURING MULTI-MEDIA BROADCASTS

(75) Inventor: Donald J. Hejna, Jr., Los Altos, CA (US)

(73) Assignee: Enounce, Inc., Palo Alto, CA (US)

( * ) Notice: Subject to any disclaimer, the term of this patent is extended or adjusted under 35 U.S.C. 154(b) by 641 days.

(21) Appl. No.: 10/452,966

(22) Filed: Jun. 2, 2003

(65) Prior Publication Data
US 2003/0212997 A1 Nov. 13, 2003

Related U.S. Application Data

(63) Continuation of application No. 09/325,245, filed on Jun. 3, 1999, now Pat. No. 6,598,228, which is a continuation-in-part of application No. 09/320,374, filed on May 26, 1999, now Pat. No. 6,934,759.

(51) Int. Cl.
*H04N 7/16* (2006.01)
*H04N 7/173* (2006.01)

(52) U.S. Cl. .......... 725/100; 725/28; 725/85; 725/87; 725/104

(58) Field of Classification Search ........ 725/28, 725/85, 87, 100, 104, 133, 141, 153; 382/100, 382/173, 305
See application file for complete search history.

(56) References Cited

U.S. PATENT DOCUMENTS

| | | | |
|---|---|---|---|
| 5,172,111 A | 12/1992 | Olivo, Jr. ............ | 340/825.31 |
| 5,175,769 A | 12/1992 | Hejna, Jr. et al. .......... | 381/34 |
| 5,384,598 A | 1/1995 | Rodriguez et al. ......... | 348/384 |
| 5,608,651 A | 3/1997 | Leavy et al. ............. | 364/514 |
| 5,649,050 A | 7/1997 | Hardwick et al. ........ | 395/2.12 |
| 5,659,539 A | 8/1997 | Porter et al. .......... | 395/200.61 |
| 5,668,948 A | 9/1997 | Belknap et al. ........ | 395/200.61 |
| 5,682,597 A | 10/1997 | Ganek et al. ............. | 455/4.2 |
| 5,692,213 A | 11/1997 | Goldberg et al. .......... | 395/806 |
| 5,721,878 A | 2/1998 | Ottesen et al. ............ | 395/500 |
| 5,724,646 A | 3/1998 | Ganek et al. ............. | 455/4.2 |
| 5,732,217 A | 3/1998 | Emura ................. | 395/200.49 |
| 5,734,735 A * | 3/1998 | Coleman, Jr. ............. | 382/100 |
| 5,761,417 A | 6/1998 | Henley et al. ......... | 395/200.09 |
| 5,768,539 A | 6/1998 | Metz et al. ............ | 395/200.79 |
| 5,778,108 A * | 7/1998 | Coleman, Jr. ............ | 382/305 |
| 5,805,804 A | 9/1998 | Laursen et al. ........ | 395/200.15 |
| 5,859,662 A | 1/1999 | Cragun et al. ............ | 348/13 |
| 5,893,062 A | 4/1999 | Bhadkamkar et al. ...... | 704/270 |
| 5,973,683 A | 10/1999 | Cragun et al. ............ | 345/327 |
| 6,061,471 A * | 5/2000 | Coleman, Jr. ............. | 382/173 |
| 6,065,050 A | 5/2000 | DeMoney .............. | 709/213 |
| 6,078,958 A | 6/2000 | Echeita et al. ........... | 709/226 |

* cited by examiner

Primary Examiner—Kieu-oanh Bui
(74) Attorney, Agent, or Firm—Michael B. Einschlag

(57) ABSTRACT

One embodiment of the present invention is a method for presenting broadcast information that comprises steps of: (a) receiving broadcast information; (b) receiving guidance information relating to presentation of the broadcast information; (c) paying for a capability to alter or override at least a portion of the guidance information; (d) receiving user input to alter or override at least some of the guidance information; (e) analyzing the guidance information, the capability, and the user input to provide one or more presentation rates; and (f) presenting the information at the one or more presentation rates.

15 Claims, 19 Drawing Sheets

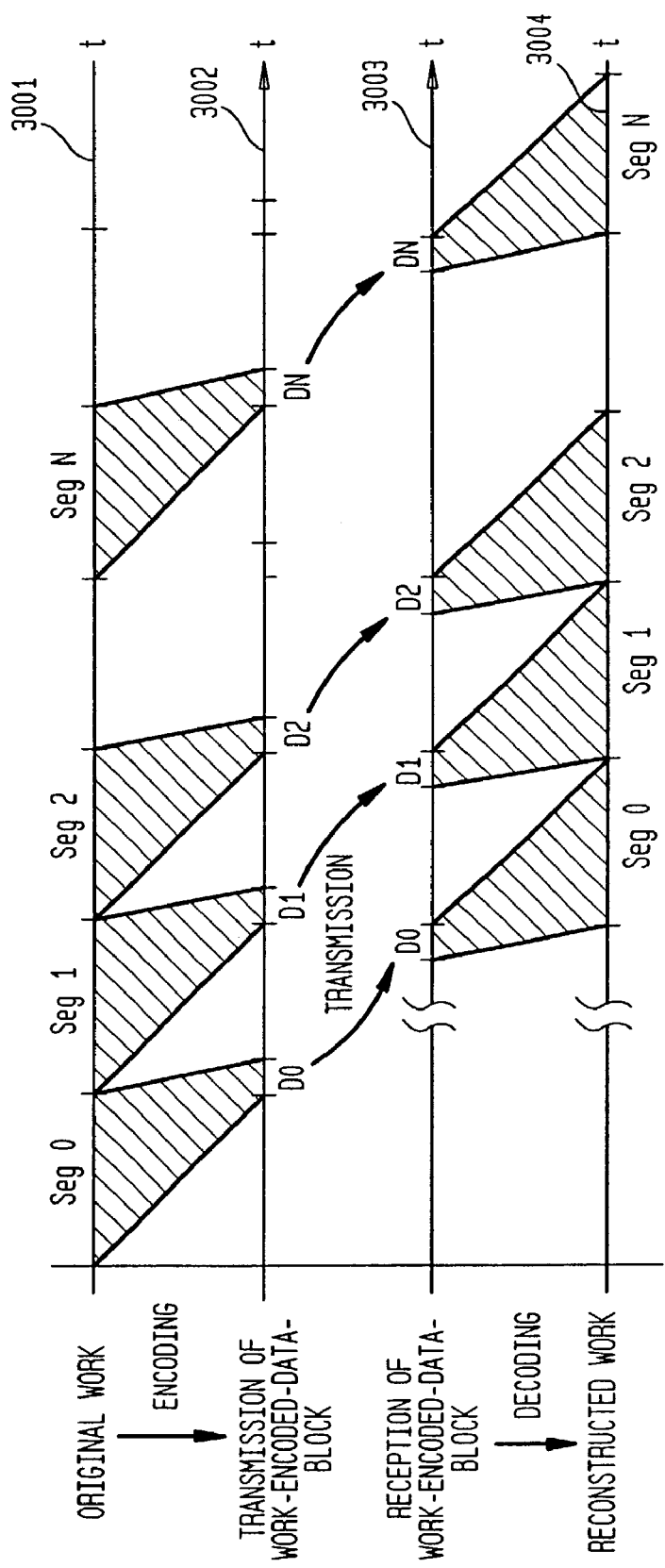

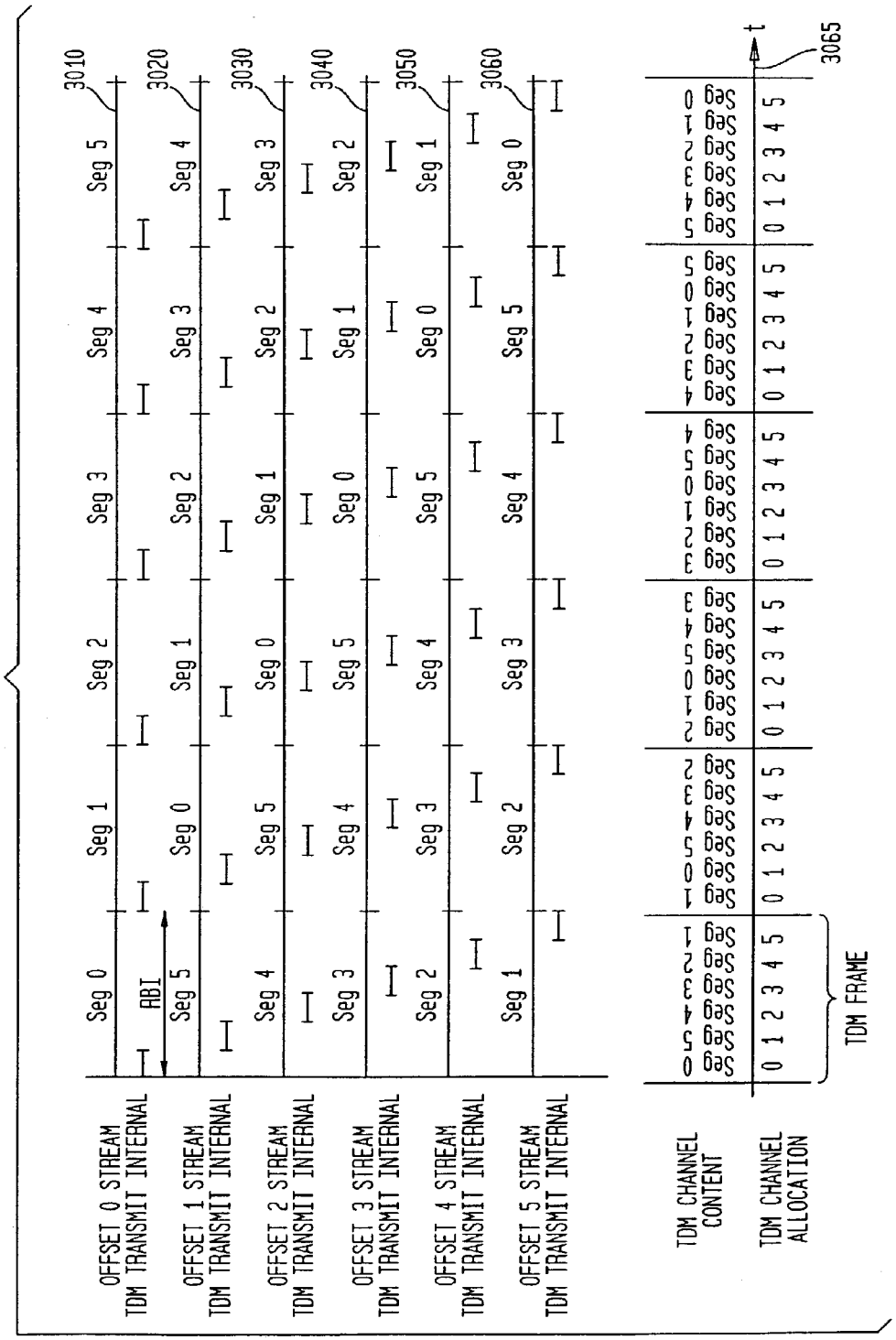

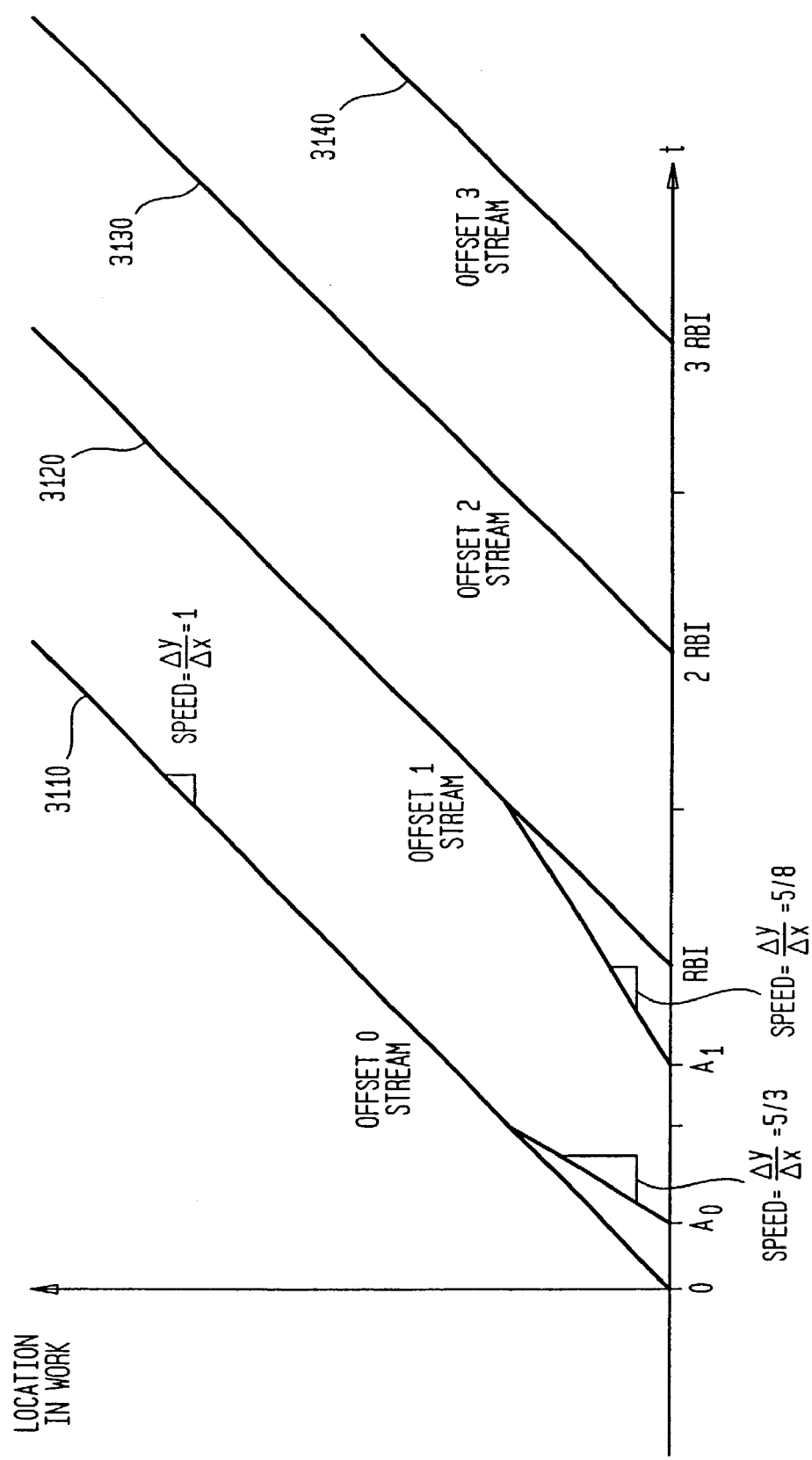

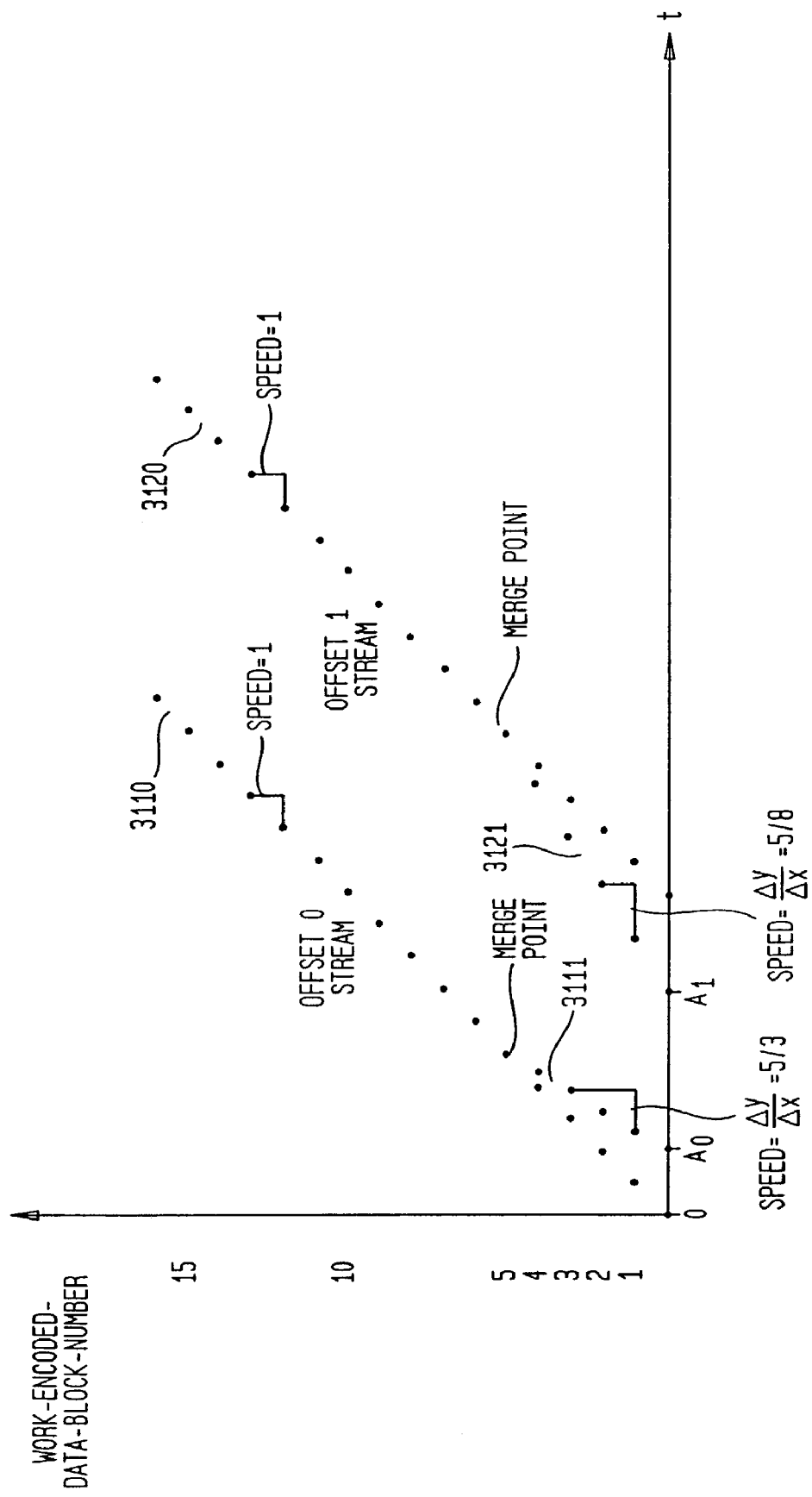

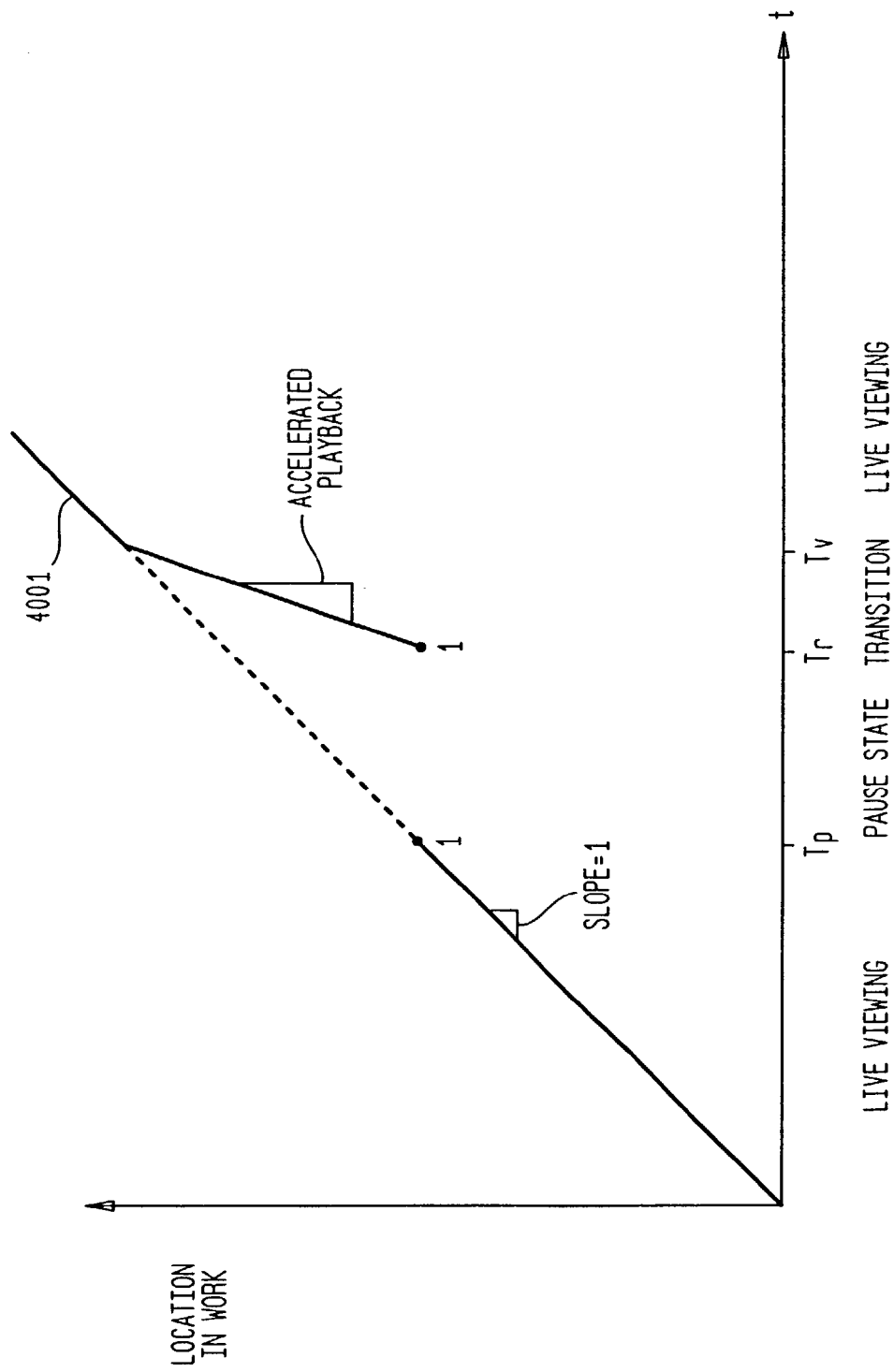

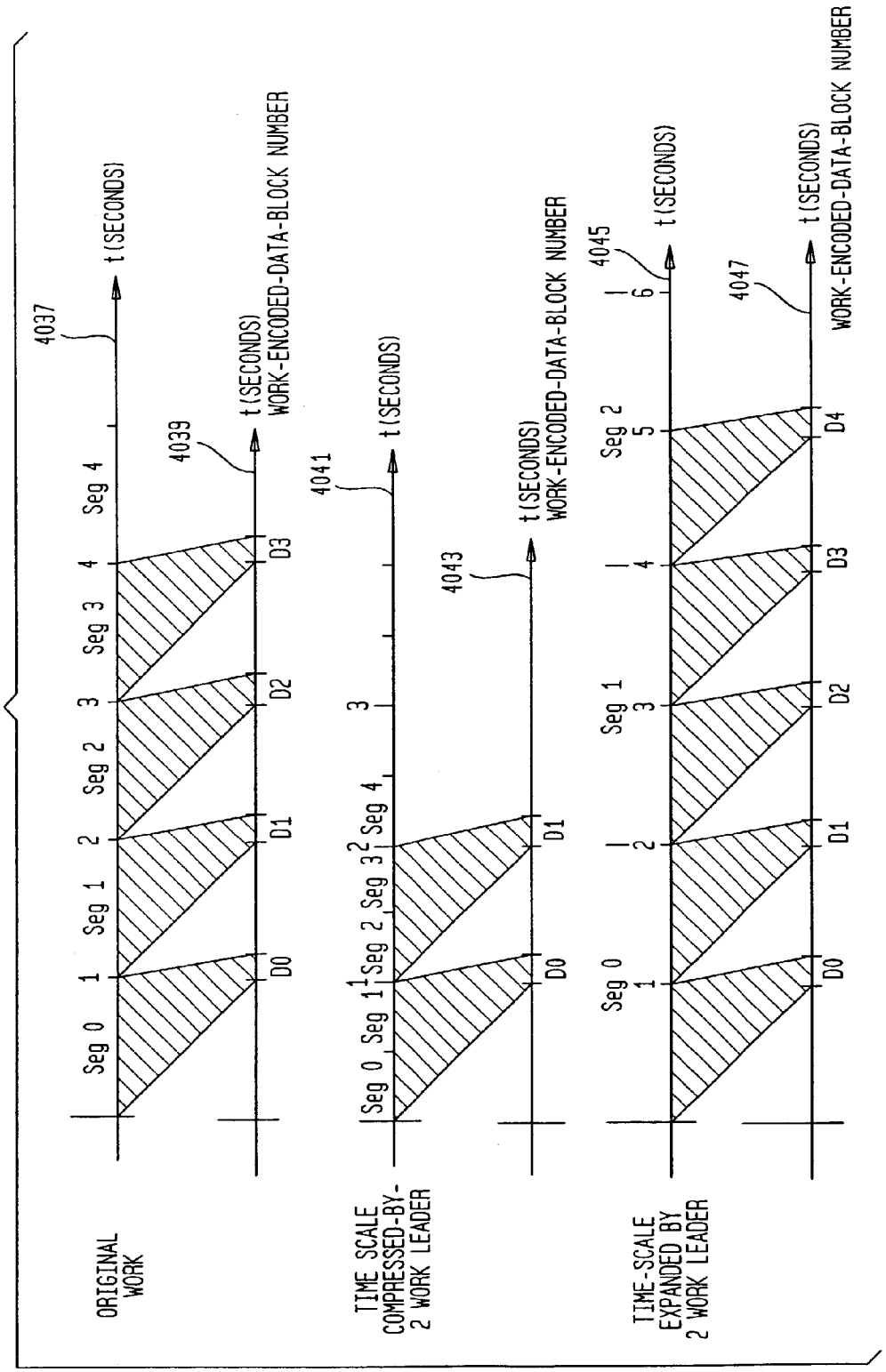

FIG. 17

| BIT-FIELD INPUT VALUE | CONTENT VALUE |
|---|---|
| 0 | START OF PROGRAM |
| 1 | END OF PROGRAM |
| 2 | START OF COMMERCIAL |
| 3 | END OF COMMERCIAL |
| 4 | TALK SHOW |
| 5 | ADVERTISEMENT |
| 6 | SITCOM |
| 7 | MOVIE |
| 8 | NEWS |
| 9 | EDUCATIONAL |
| 10 | PUBLIC SERVICE |
| 11 | STATION I.D. |
| 12 | ADULT LANGUAGE |
| 13 | NUDITY |
| 14 | VIOLENCE |
| 15 | EMERGENCY |

— 30200

| INSISTENCE FORMAT BIT-FIELD VALUE | INSISTENCE BIT-FIELD INPUT VALUE | STATE 0 | STATE 1 | STATE 2 |
|---|---|---|---|---|
| 0 | 0 | 0 | 0 | 0 |
| 0 | 1 | 1 | 0 | 1 |
| 0 | 2 | 2 | 0 | 1 |
| 0 | 3 | 3 | 3 | 2 |
| 1 | 0 | -2 | -3 | -2 |
| 1 | 1 | -1 | -2 | -1 |
| 1 | 2 | +1 | -1 | +1 |
| 1 | 3 | +3 | +3 | +2 |

30300

METHOD AND APPARATUS FOR CONTROLLING TIME-SCALE MODIFICATION DURING MULTI-MEDIA BROADCASTS

This is a continuation of a patent application entitled "Method and Apparatus for Controlling Time-Scale Modification During Multi-Media Broadcasts" having Ser. No. 09/325,245 which was filed on Jun. 3, 1999 now U.S. Pat. No. 6,598,228, which patent application was a continuation-in-part of a patent application entitled "Method and Apparatus for User-Time-Alignment for Broadcast Works" having Ser. No. 09/320,374 which was filed on May 26, 1999 now U.S. Pat. No. 6,934,759. This patent application is related to a patent application entitled "Method and Apparatus for Server Broadcast of Time-Converging Multi-Media Streams" having Ser. No. 09/320,008 which was filed on May 26, 1999 and is now U.S. Pat. No. 6,370,688.

TECHNICAL FIELD OF THE INVENTION

The present invention pertains to multi-media broadcast and presentation of broadcast multi-media. In particular, the present invention pertains to method and apparatus for controlling Time-Scale Modification of broadcast multi-media (such as, for example, audio and audio-visual works).

BACKGROUND OF THE INVENTION

Many digitally encoded audio and audio-visual works are stored as data on servers (such as file servers or streaming media servers) that are accessible via the Internet for users to download. FIG. 1 shows, in schematic form, how such audio or audio-visual works are distributed over the Internet. As shown in FIG. 1, media broadcast server 2000 accesses data representing the audio or audio-visual work from storage medium 2100 and broadcasts the data to multiple recipients $2300_1$ to $2300_n$ across non-deterministic delay network 2200. In this system there are two main sources of random delay: (a) delay due to media broadcast server 2000 accessing storage medium 2100 and (b) delay due to the congestion, interference, and other delay mechanisms within network 2200.

One well known technique for providing playback of the audio or audio-visual work is referred to as batch playback. Batch playback entails downloading an entire work and initiating playback after the entire work has been received. Another well known technique for providing playback of the audio or audio-visual work is referred to as "streaming." Streaming entails downloading data which represents the audio or audio-visual work and initiating playback before the entire work has been received.

There are several disadvantages inherent in both of these techniques. A prime disadvantage of batch playback is that the viewer/listener must wait for the entire work to be downloaded before any portion of the work may be played. This can be tedious since the viewer/listener may wait a long time for the transmission to occur, only to discover that the work is of little or no interest soon after playback is initiated. The streaming technique alleviates this disadvantage of batch playback by initiating playback before the entire work has been received. However, a disadvantage of streaming is that playback is often interrupted when the flow of data is interrupted due to network traffic, congestion, transmission errors, and the like. These interruptions are tedious and annoying since they occur randomly and have a random duration. In addition, intermittent interruptions often cause the context of the playback stream to be lost as the viewer/listener waits for playback to be resumed when new data is received. A further disadvantage of streaming is that a user or client is required to poll for additional data according to its rate of use of the data. In this manner, a user or client using data at a rapid rate has to make additional requests for data at a higher rate than a user or client using the data at a slower rate.

A further disadvantage in broadcasting audio or audio-visual works using prior art methods occurs when clients request data asynchronously from the media server. Currently, there are two prior art methods for broadcasting a work to multiple clients requesting data at arbitrary times. The first prior art method involves re-broadcasting the work at regular intervals. This prior art method is efficient for the media server since its storage access patterns and load are basically independent of the number of clients receiving the audio or audio-visual work. A major problem with this prior art method is that clients must join a re-broadcast in the middle of the audio or audio-visual work currently being broadcast, or wait for the next re-broadcast to begin to view the start of the audio or audio-visual work.

The second prior art method initiates a re-broadcast of the audio or audio-visual work each time a client requests to view the audio or audio-visual work. This prior art method has the advantage that client do not have to wait to view the start of work and begin reception immediately. A major problem with this second prior art method is that the media server must monitor, track and fulfill the request of each client requesting data individually. This causes a dramatic increase in server load during heavy use since multiple requests arrive simultaneously, and storage access patterns and broadcast load vary widely. As a result, the media server's capacity to serve a number of clients in a reasonable time is limited.

As one can readily appreciate from the above, a need exists in the art for a method and apparatus for providing substantially continuous playback of streaming media such as audio and audio-visual works received from sources having non-deterministic delays such as a file server broadcasting data via the Internet. In addition, a need exists in the art for a method and apparatus for broadcasting streaming media on an efficient basis that maximizes broadcast media server capacity.

In addition to the problems described above, there is a need in the art for method and apparatus to control presentation rates of broadcast multi-media. For example, a public service announcement regarding emergency information, safety information, and the like may be missed if a user is listening at a very fast rate (learning impaired and hearing impaired individuals may wish to have important public service or emergency broadcasts played at playback rates below the normal playback rate to aid in comprehension). Since these messages may be of vital importance, a need exists for method and apparatus to restrict or direct the playback rate for a client apparatus in a client-server system and/or broadcaster-recipient system and/or to notify the client apparatus or recipient device of the importance of these messages. In addition to a need for controlling playback rate relating, for example, to public safety, there is a need in the art for method and apparatus to provide different delivery times for specific types of content, such as commercial advertisements, station identification, violence, nudity, adult language, program schedule information, and program information pertaining to audience suitability or content.

SUMMARY OF THE INVENTION

Embodiments of the present invention advantageously satisfy the above-identified need in the art and provide method and apparatus for controlling presentation rates of broadcast multi-media.

One embodiment of the present invention is a method for presenting broadcast information that comprises steps of: (a) receiving broadcast information; (b) receiving guidance information relating to presentation of the broadcast information; (c) paying for a capability to alter or override at least a portion of the guidance information; (d) receiving user input to alter or override at least some of the guidance information; (e) analyzing the guidance information, the capability, and the user input to provide one or more presentation rates; and (f) presenting the information at the one or more presentation rates.

BRIEF DESCRIPTION OF THE DRAWING

FIG. 8A shows, in graphical form, encoding, transmitting and decoding portions of an audio or audio-visual work;

FIG. 8B shows, in graphical form, a composition and transmission method utilized by Work Stream 3200 to form and transmit a TDM composite signal to Multicaster 3300 of embodiment 3000 shown in FIG. 7 of embodiment 3000;

FIG. 9A shows a graph of location of a segment (offset from an origin) of the audio or audio-visual work being re-broadcast by embodiment 3000 shown in FIG. 7 as a function of time;

FIG. 9B shows a graph of work-encoded-data-block number (offset from an origin) of the audio or audio-visual work being re-broadcast by embodiment 4000 shown in FIG. 10 as function of time;

FIG. 9C shows a graph of position (offset from an origin) of an audio or audio-visual work being received by a media playback device that incorporates storage of the audio or audio-visual work, such as, for example a digital VCR, hard-disk based VCR, and the like;

FIG. 11B shows, in graphical form, encoding portions of a Time-Scale Modified audio or audio-visual work to form Time-Scale Modified Leaders;

FIG. 17 shows a Content Look-Up Table to illustrate how embodiment 21000 uses content information to determine playback rates of at least portions of the media work.

DETAILED DESCRIPTION

Figure 1:
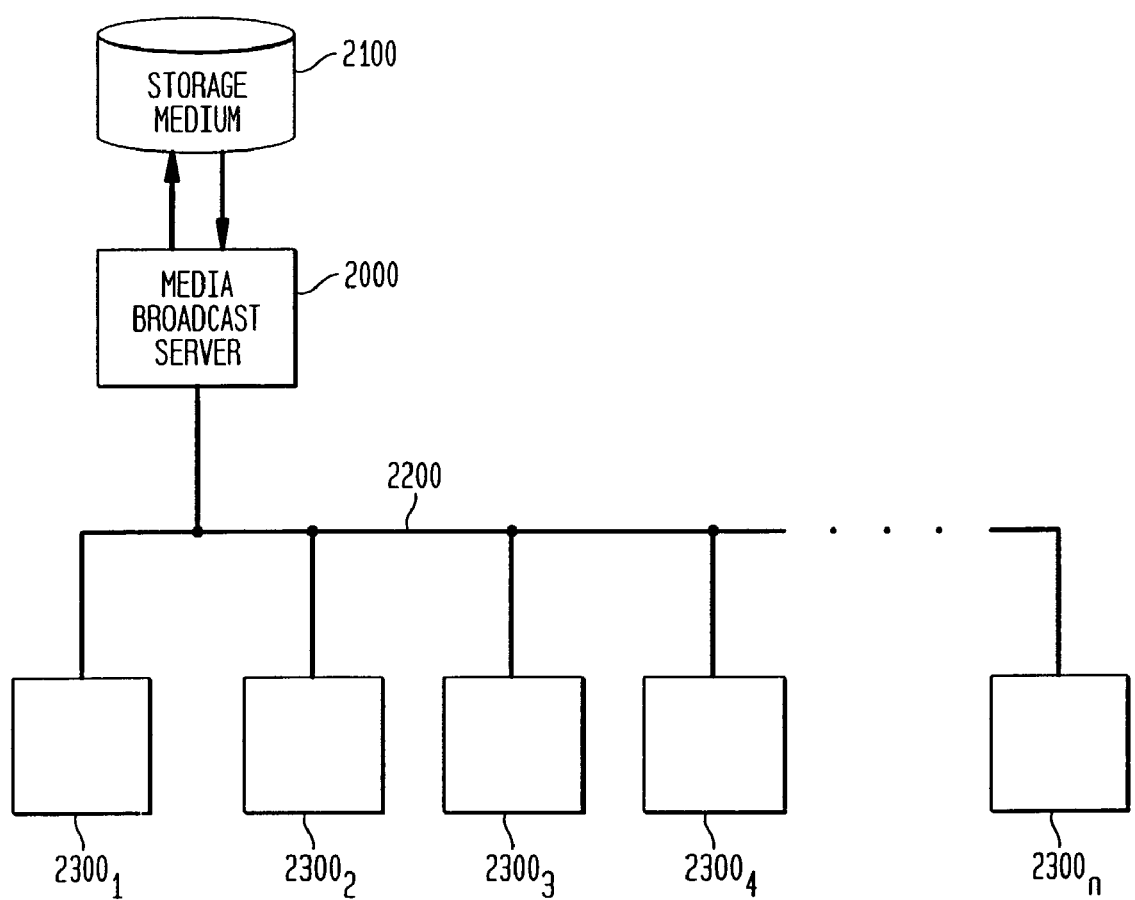
FIG. 1 shows, in schematic form, how audio or audio-visual works are broadcast from a server (for example, a file server or a streaming media server) to recipients over a network such as, for example, the Internet.
Figure 2:
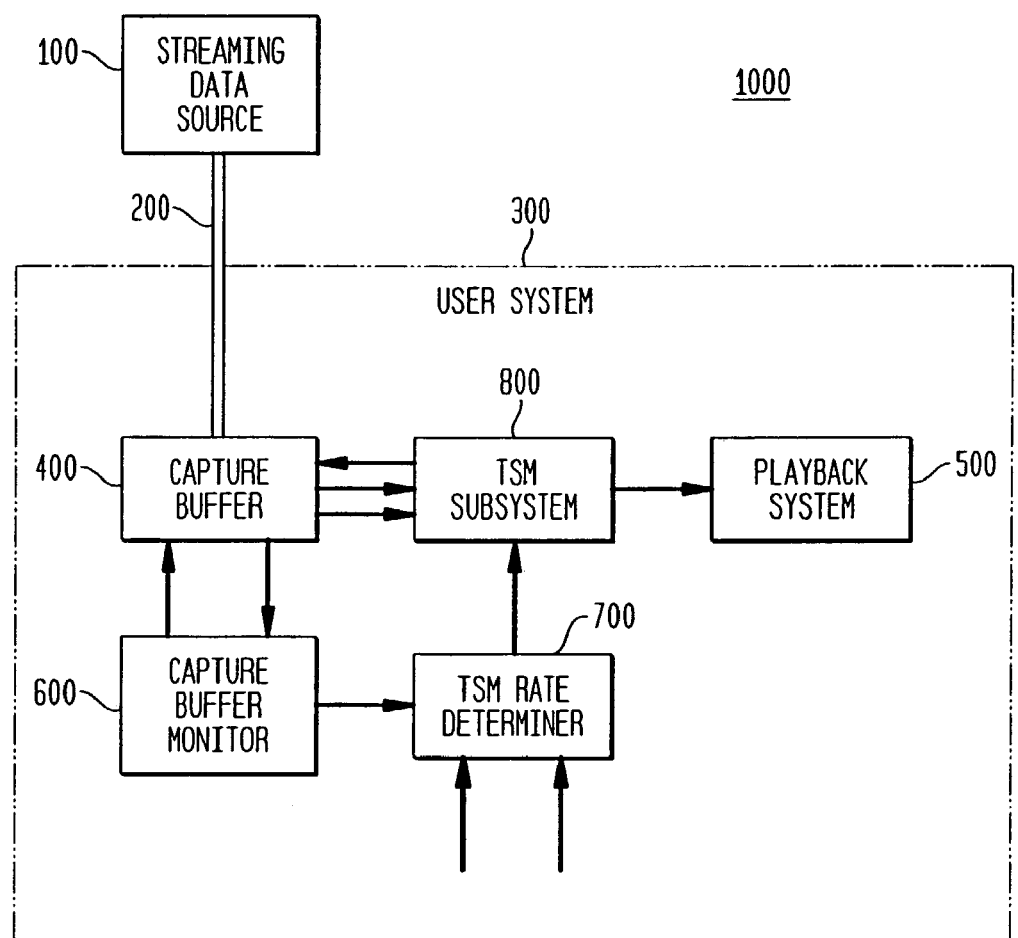
FIG. 2 shows a block diagram of an embodiment of the present invention which provides substantially continuous playback of an audio or audio-visual work received from a source having non-deterministic delays such as a server (for example, a file server or a streaming media server) broadcasting data via the Internet.

FIG. 2 shows a block diagram of embodiment 1000 of the present invention which provides substantially continuous playback of an audio or audio-visual work received from a source having non-deterministic delays such as a server (for example, a file server or a streaming media server) broadcasting via the Internet. As shown in FIG. 2, streaming data source 100 provides data representing an audio or audio-visual work through network 200 to User System 300 (US 300), which data is received at a non-deterministic rate by US 300. Capture Buffer 400 in US 300 receives the data as input. In a preferred embodiment of the present invention, Capture Buffer 400 is a FIFO (First In First Out) buffer existing, for example, in a general purpose memory store of US 300.

In the absence of delays in arrival of data at US 300 from network 200, the amount of data in Capture Buffer 400 ought to remain substantially constant as a data transfer rate is typically chosen to be substantially equal to a playback rate. However, as is well known to those of ordinary skill in the art, pauses and delays in transmission of the data through network 200 to Capture Buffer 400 cause data depletion therein. Data depletion in Capture Buffer 400 occurs because, simultaneously, data is input thereto from network 200 while data is output (for example, at a constant rate) therefrom to satisfy data use requirements of Playback System 500. As should be clear to those of ordinary skill in the art, if data transmitted to US 300 is delayed long enough, data in Capture Buffer 400 will be consumed, and Playback System 500 must pause until a sufficient amount of data has arrived to enable resumption of playback. Thus, a typical playback system must constantly check for arrival of new data while the playback system is paused, and it must initiate playback once a sufficient amount of new data is received.

In accordance with the present invention, data input to Capture Buffer 400 of US 300 is buffered for a predetermined amount of time, which predetermined amount of time typically varies, for example, from one (1) second to several seconds. Then, Time-Scale Modification (TSM) methods are used to slow the playback rate of the audio or audio-visual work to substantially match a data drain rate required by Playback System 500 with a streaming data rate of the arriving data representing the audio or audio-visual work. As is well known to those of ordinary skill in the art, presently known methods for Time-Scale Modification ("TSM") enable digitally recorded audio to be modified so that a perceived articulation rate of spoken passages, i.e., a speaking rate, can be modified dynamically during playback. During Time-Scale expansion, TSM System 800 requires less input data to generate a fixed interval of output data. Thus, in accordance with the present invention, if a delay occurs during transmission of the audio or audio-visual work from network 200 to US 300 (of course, it should be clear that such delays may result from any number of causes such as delays in accessing data from a storage device, delays in transmission of the data from a media server, delays in transmission through network 200, and so forth), the playback rate is automatically slowed to reduce the amount of data drained from Capture Buffer 400 per unit time. As a result, and in accordance with the present invention, more time is provided for data to arrive at US 300 before the data in Capture Buffer 400 is exhausted. Advantageously, this delays the onset of data depletion in Capture Buffer 400 which would cause Playback System 500 to pause.

As shown in FIG. 2, Capture Buffer 400 receives the following as input: (a) media data input from network 200; (b) requests for information about the amount of data stored therein from Capture Buffer Monitor 600; and (c) media stream data requests from TSM System 800. In response, Capture Buffer 400 produces the following as output: (a) a stream of data representing portions of an audio or audio-visual work (output to TSM System 800); (b) a stream of location information used to identify the position in the stream of data (output to TSM System 800); and (c) the amount of data stored therein (output to Capture Buffer Monitor 600). It should be well known to those of ordinary skill in the art that Capture Buffer 400 may include a digital storage device. There are many methods well known to those of ordinary skill in the art for utilizing digital storage devices, for example a "hard disk drive," to store and retrieve general purpose data. There exist many commercially available apparatus which are well known to those of ordinary skill in the art for use as a digital storage device such as, for example, a CD-ROM, a digital tape, a magnetic disc.

As further shown in FIG. 2, and in accordance with the present invention, TSM Rate Determiner 700 receives the following as input: (a) a signal (from Capture Buffer Monitor 600) that represents the amount of data present in Capture Buffer 400; (b) a signal (output, for example, from Playback System 500 or from another module of US 300) that represents a current data consumption rate of Playback System 500; (c) a low threshold value parameter ($T_L$ which is described in detail below) for the amount of data in Capture Buffer 400; (d) a high threshold value parameter ($T_H$ which is described in detail below) for the amount of data in Capture Buffer 400; (e) a parameter designated Interval_Size; and (f) a parameter designated Speed_Change_Resolution. In response, TSM Rate Determiner 700 produces as output a rate signal representing a TSM rate, or playback rate, which can help better balance the data consumption rate of Playback System 500 with an arrival rate of data at Capture Buffer 400.

In a preferred embodiment of the present invention, TSM Rate Determiner 700 uses the parameter Interval_Size to segment the input digital data stream in Capture Buffer 400 and to determine a single TSM rate for each segment of the input digital stream. Note, the length of each segment is given by the value of the Interval_Size parameter.

TSM Rate Determiner 700 uses the parameter Speed_Change_Resolution to determine appropriate TSM rates to pass to TSM System 800. A desired TSM rate is converted to one of the quantized levels in a manner which is well known to those of ordinary skill in the art. This means that the TSM rate, or playback rate, can change only if the desired TSM rate changes by an amount that exceeds the difference between quantized levels, i.e., Speed_Change_Resolution. As a practical matter then, parameter Speed_Change_Resolution filters small changes in TSM rate, or playback rate. The parameters Interval_Size and Speed_Change_Resolution can be set as predetermined parameters for embodiment 1000 in accordance with methods which are well known to those of ordinary skill in the art or they can be entered and/or varied by receiving user input through a user interface in accordance with methods which are well known to those of ordinary skill in the art. However, the manner in which these parameters are set and/or varied are not shown for ease of understanding the present invention.

As still further shown in FIG. 2, TSM System 800 receives as input: (a) a stream of data representing portions of the audio or audio-visual work (output from Capture Buffer 400); (b) a stream of location information (output from Capture Buffer 400) used to identify the position in the stream of data being sent, for example, a sample count or time value; and (c) the rate signal specifying the desired TSM rate, or playback rate (output from TSM Rate Determiner 700).

Figure 5:
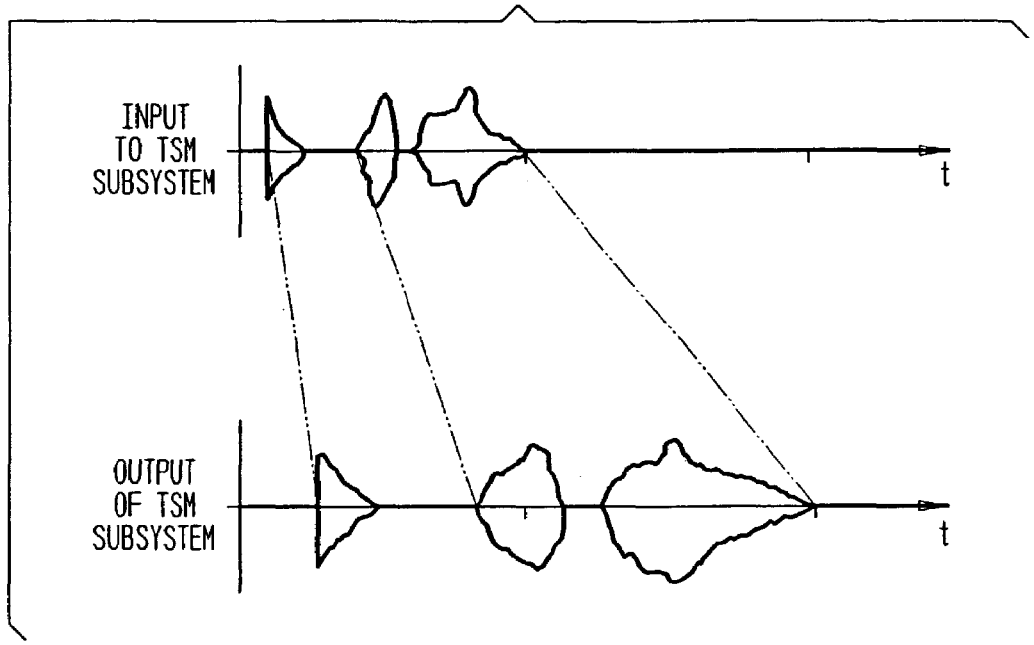
FIG. 5. shows, in graphical form, relative amounts of data at an input and an output of TSM System 800 in the embodiment of the present invention shown in FIG. 2 during time-scale expansion, i.e., slow down of the playback rate of the streaming media.
Figure 6:
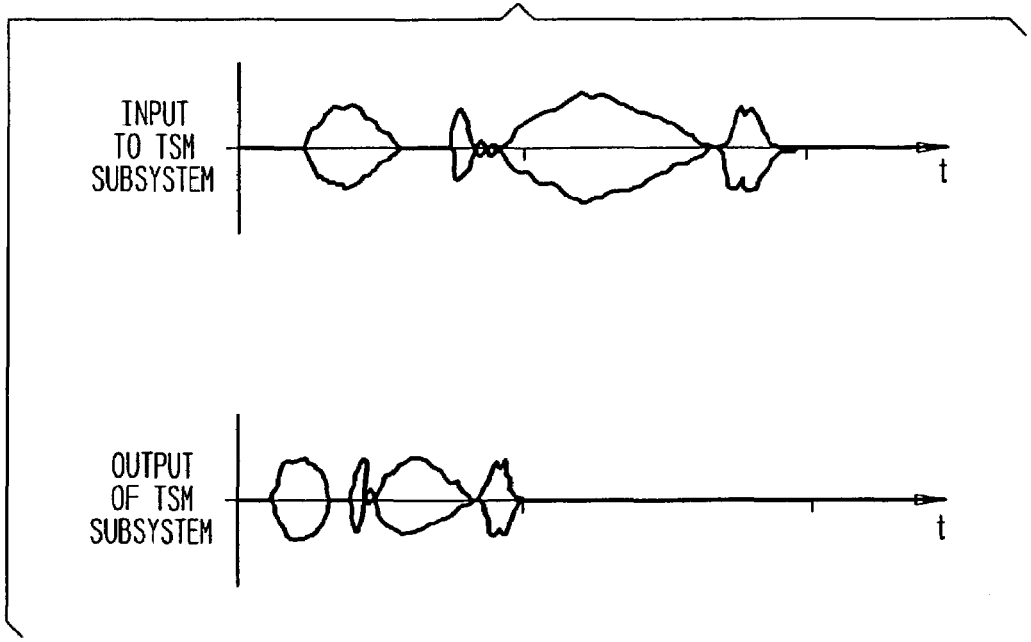
FIG. 6. shows, in graphical form, relative amounts of data at an input and an output of TSM System 800 compression in the embodiment of the present invention shown in FIG. 2 during time-scale compression, i.e., speed up of the playback-rate of the streaming media.

In accordance with the present invention, TSM System 800 modifies the input stream of data in accordance with well known TSM methods to produce, as output, a stream of samples that represents a Time-Scale Modified signal. The Time-Scale modified output signal contains fewer samples per block of input data if Time-Scale Compression is applied, as shown in FIG. 6. Similarly, if Time-Scale Expansion is applied, the output from TSM System 800 contains more samples per block of input data, as shown in FIG. 5. Thus, TSM System 800 can create more samples than it is given by creating an output stream with a slower playback rate (Time-Scale Expanded). Similarly, TSM System 800 can create fewer samples than it is given by creating an output stream with a faster playback rate (Time-Scale Compressed). In a preferred embodiment of the present invention, the TSM method used is a method disclosed in U.S. Pat. No. 5,175,769 (the '769 patent), which '769 patent is incorporated by reference herein, the inventor of the present invention also being a joint inventor of the '769 patent. Thus, the output from TSM System 800 is a stream of samples representing portions of the audio or audio-visual work, which output is applied as input to Playback System 500. Playback System 500 plays back the data output from TSM System 800. There are many well known methods of implementing Playback System 500 that are well known to those of ordinary skill in the art. For example, many methods are known to those of ordinary skill in the art for implementing Playback system 500, for example, as a playback engine.

In accordance with the present invention, the stream of digital samples output from TSM System 800 has a playback rate, supplied from TSM Rate Determiner 700, that provides a balance of the data consumption rate of TSM System 800 with the arrival rate of data input to US 300. Note that, in accordance with this embodiment of the present invention, the data consumption rate of Playback System 500 is fixed to be identical to the data output rate of TSM System 800. Thus, when a playback rate representing Time-Scale Expansion is output from TSM Rate Determiner 700 and applied as input to TSM System 800, the number of data samples required per unit time by TSM System 800 is reduced in proportion to the amount of Time-Scale Expansion. A reduction in the number of data signals sent to TSM System 800 slows the data drain-rate from Capture Buffer 400 and, as a result, less data from Capture Buffer 400 is consumed per unit time. This, in turn, increases the amount of playback time before a pause is required due to emptying of Capture Buffer 400.

As one of ordinary skill in the art should readily appreciate, although the present invention has been described in terms of slowing down playback, the present invention is not thusly limited and includes embodiments where the playback rate is increased in situations where data arrives in Capture Buffer 400 at a rate which is faster than the rate at which it would be consumed during playback at a normal rate. In this situation, the playback rate is increased and the data is consumed by TSM System 800 at a faster rate to avoid having Capture Buffer 400 overflow.

As one of ordinary skill in the art can readily appreciate, whenever embodiment 1000 provides playback rate adjustments for an audio-visual work, TSM System 800 speeds up or slows down visual information to match the audio in the audio-visual work. To do this in a preferred embodiment, the video signal is "Frame-subsampled" or "Frame-replicated" in accordance with any one of the many methods known to those of ordinary skill in the prior art to maintain synchronism between the audio and visual portions of the audio-visual work. Thus, if one speeds up the audio and samples are requested at a faster rate, the frame stream is sub-sampled, i.e. frames are skipped.

Although FIG. 2 shows embodiment 1000 to be comprised of separate modules, in a preferred embodiment, Playback System 500, Capture Buffer Monitor 600, TSM Rate Determiner 700, and TSM System 800 are embodied as software programs or modules which run on a general purpose computer such as, for example, a personal computer. It should be well known to one of ordinary skill in the art, in light of the detailed description above, how to implement these programs or modules in software.

As should be clear to those of ordinary skill in the art, embodiments of the present invention include the use of any one of a number of algorithms for determining the playback rate to help balance the rate of data consumption for playing back the audio or audio-visual works with the rate of data input from network 200 having non-deterministic delays. In one embodiment of the present invention, the playback rate is determined to vary with the fraction of Capture Buffer 400 that is filled with data. For example, for each 10% decrement of data depletion, the playback rate is reduced by 10%, except when the input data contains an "end" signal. It should be clear to those of ordinary skill in the art how to modify this algorithm to achieve any of a number of desired balance conditions. For example, in situations where a delay duration can vary drastically, a non-linear relationship may be used to determine the playback rate. One non-linear function that may be used is the inverse tangent function. In this case, $$\text{Playback Rate} = \tan h^{-1}((2 \ast \#samples\_in\_buffer/elements\_in\_buffer))-1) \quad (1)$$

where #samples_in_buffer is the number of samples of data in Capture Buffer 400 and elements_in_buffer is the total number of samples of data that can be stored in Capture Buffer 400.

Figure 3:
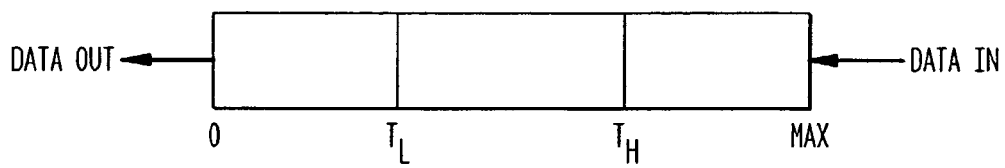
FIG. 3 shows, in pictorial form, low and high thresholds used in one embodiment of Capture Buffer 400 for the embodiment of the present invention shown in FIG. 2.

In a preferred embodiment of the present invention, a low threshold ($T_L$) value and a high threshold ($T_H$) value are be used to construct a piece-wise graph of playback rate versus amount of data in Capture Buffer 400. FIG. 3 shows, in pictorial form, how $T_L$ and $T_H$ relate to the amount of data in Capture Buffer 400. These thresholds are used in accordance with the following set of equations:

$$\text{For } 0 <= X <= T_L \text{ Playback Rate} = \text{Scale} \ast \tan h^{-1}((X-T_L)/T_L) \quad (2)$$

$$\text{For } T_L < X < T_H \text{ Playback Rate} = 1.0 \text{ (the default playback rate)} \quad (3)$$

$$\text{For } T_H <= X <= \text{Max Playback Rate} = \text{Scale} \ast \tan h^{-1}((X-T_H)/(\text{Max}-T_H)) \quad (4)$$

where Scale is arbitrary scale factor.

Figure 4:
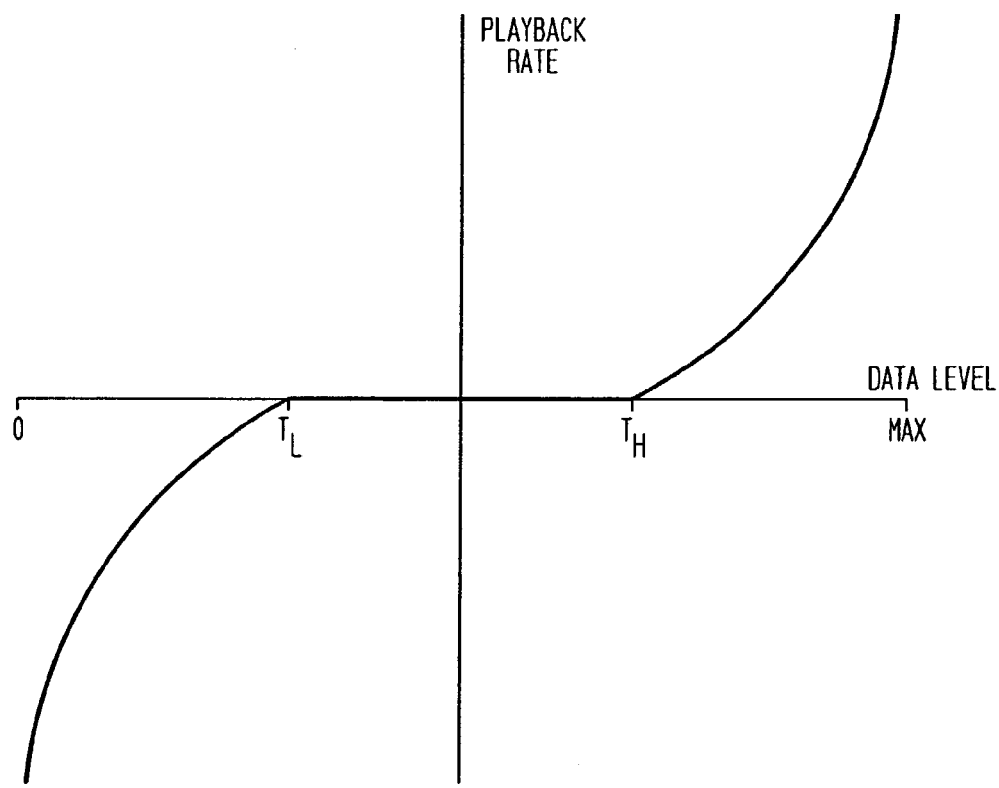
FIG. 4. shows a graph of playback rate versus amount of data in Capture Buffer 400 using eqns. (2)–(4) for the embodiment of the present invention shown in FIG. 2.

FIG. 4. shows a graph of playback rate versus amount of data in Capture Buffer 400 using eqns. (2)–(4). From FIG. 4, one can readily appreciate that for small deviations from an ideal amount of data in Capture Buffer 400 (origin 0 in FIG. 4), changes in the playback rate are linear; however, larger deviations generate a more pronounced non-linear response. Further, changes in the amount of data in Capture Buffer 400 which remain between low threshold level $T_L$ and high threshold level $T_H$ do not cause any change in playback rate. The parameters $T_L$ and $T_H$ can be set as predetermined parameters for embodiment 1000 in accordance with methods which are well known to those of ordinary skill in the art or they can be entered and/or varied by receiving user input through a user interface in accordance with methods which are well known to those of ordinary skill in the art. However, the manner in which these parameters are set and/or varied are not shown for ease of understanding the present invention.

As should be clear to those of ordinary skill in the art, the inventive technique for providing substantially continuous playback may be combined with any number of apparatus which provide time-scale modification and may be combined with or share components with such systems.

It should be clear to those of ordinary skill in the art, in light of the detailed description set forth above, that in essence, embodiments of the present invention (a) determine a measure of a mismatch between a data arrival rate and a data consumption rate and (b) utilize time-scale modification to adjust these rates. Various embodiments of the invention utilize various methods (a) for determining information which indicates the measure of the mismatch and (b) for determining a playback rate which enables time-scale modification to adjust for the mismatch in a predetermined amount.

In light of this, in another embodiment of the present invention, the playback system determines that there is a data mismatch because it determines a diminution in the arrival of data for playback or subsequent distribution. In response, the playback system sends this information to the TSM Rate Determiner to develop an acceptable playback rate. For example, the playback rate may be reduced by a predetermined amount based on an input parameter or in accordance with any one of a number of algorithms that may be developed by those of ordinary skill in the art.

Embodiments of the present invention are advantageous in enabling a single-broadcast system utilizing a broadcast server to provide a single broadcast across one or more non-deterministic delay networks to multiple recipients, for example across the Internet and/or other networks such as Local Area Networks (LANs) and Wide Area Networks (WANs). In such a single-broadcast system, the path to each recipient varies. In fact, the path to each recipient may dynamically change based on loading, congestion and other factors. Therefore, the amount of delay associated with the transmission of each data packet that has been sent by the broadcast server varies. In prior art client-server schemes, each recipient has to notify the broadcast server of its readiness to receive more data, thereby forcing the broadcast server to serve multiple requests to provide a steady stream of data at the recipients' data ports. Advantageously, embodiments of the present invention enable the broadcast server to send out a steady stream of information, and the recipients of the intermittently arriving data to adjust the playback rate of the data to accommodate the non-uniform arrival rates. In addition, in accordance with the present invention, each of the recipients can accommodate the arrival rates independently.

Another aspect of the present invention advantageously involves simplification of a transmission protocol used for communication of streaming media between a client and, for example, a server such as a media or broadcast server. In accordance with this additional aspect of the present invention, an inventive transmission protocol comprises the client's sending a data transmission rate to the media or broadcast server. In response, the server transmits data to the server substantially at that rate. In one embodiment of the present invention, the data transmission rate is in the form of a playback rate for a work. In this case, the server adjusts its data transmission rate in a manner which is well known to those of ordinary skill in the art so that the amount of data received by the client substantially matches the client's playback rate for the work. Thus, for embodiments of this aspect of the present invention, the broadcast server need not change its distribution rate unless and until a new request is received from the client. As one can readily appreciate, the inventive transmission protocol is advantageous because its use reduces: (a) a network protocol bandwidth required for streaming by substantially reducing repeated requests for data from the client and (b) the number of messages the server must process.

Another aspect of the present invention pertains to media broadcasting wherein media or broadcast servers begin broadcasts of a particular work (for example, the day's news) at regular time intervals, for example, every 5 minutes. In accordance with an embodiment of the present invention, a client that sends a request to view or listen to the particular work is sent a stream of the particular work (substantially immediately) which is closest (in the temporal sense) to the beginning of a broadcast of the particular work (in a manner that will be described in detail below) rather than waiting for a re-broadcast to begin or joining an in-progress broadcast. After a transition period (to be described in detail below), the client joins one of the regular broadcasts and receives data therefrom. Advantageously, in accordance with the present invention, there is a reduction in client wait time and a reduction in client load for the media or broadcast servers. Although embodiments of the present invention are described below in the context of broadcasting data for ease of understanding the invention, it should be understood that the present invention is not thereby limited. In fact, among other things, embodiments of the present invention can also be applied to accessing data as well.

Figure 7:
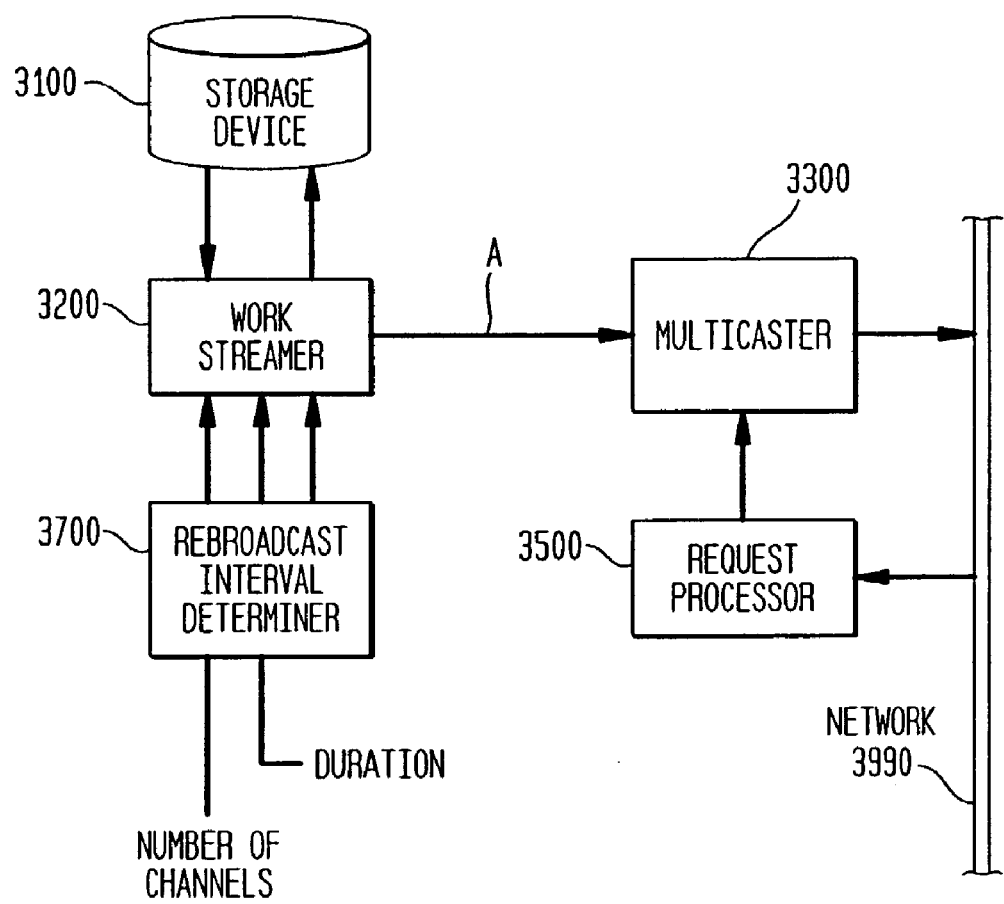
FIG. 7 shows a block diagram of media server 3000 which re-broadcasts an audio or audio-visual work is at regular intervals.

FIG. 7 shows a block diagram of embodiment 3000 of a media server which re-broadcasts an audio or audio-visual work at regular intervals. As shown in FIG. 7, Storage Device 3100 is a storage device of a type which is well known to those of ordinary skill in the art. Storage Device 3100 stores a representation (preferably a digital representation, or any representation that can be converted to a digital representation in accordance with methods which are well known to those of ordinary skill in the art) of an audio or audio-visual work or data of interest to a user (such as a stream of stock quotes, market data, advertisements, and so forth). Storage Device 3100 receives, as input, data requests from Work Streamer 3200, and provides, as output, the data requested.

As further shown in FIG. 7, Work Streamer 3200 receives as input: (a) a code (for example, a number) which represents a desired Re-broadcast Interval ("RBI") (from Re-broadcast Interval Determiner 3700); (b) a code (for example, a number) which represents a desired number of Time-Division Multiplexed (TDM) channels (from Re-broadcast Interval Determiner 3700); (c) a code (for example, a number) which represents the duration of the audio or audio-visual work being re-broadcast (from Re-broadcast Interval Determiner 3700); and (d) data from Storage Device 3100. Work Streamer 3200 produces, as output, a Time-Division Multiplexed composite signal (described in detail below), which output is applied as input to Multicaster 3300. As will be described in detail below, in accordance with the preferred embodiment of the present invention, Work Streamer 3200 creates numerous re-broadcasts of the audio or audio-visual work by sending appropriately interleaved segments of the work in the form of the Time-Division Multiplexed signal to Multicaster 3300. Advantageously, in accordance with the preferred embodiment of the present invention, data accesses to Storage Device 3100 are organized by Work Streamer 3200 to reduce seek time, decrease latency, and increase throughput by interleaving and caching accesses to data representing the audio or audio-visual work. It should be clear to those of ordinary skill in the art that embodiments of this aspect of the present invention are not limited to generating the composite Time-Division Multiplexed signal and include embodiments where the data for the various re-broadcasts are each generated from a separate signal.

As still further shown in FIG. 7, Re-broadcast Interval Determiner ("RBID") 3700 receives, as input, (a) a code (for example, a number) which represents the duration of an audio or audio/visual work and (b) a code (for example, a number) that represents the number of re-broadcast offset channels (to be described in detail below). RBID 3700 produces, as output: (a) a code (for example, a number) which represents a desired Re-broadcast Interval ("RBI") (sent to Work Streamer 3200); (b) a code (for example, a number) which represents a desired number of Time-Division Multiplexed (TDM) channels (sent to Work Streamer 3200); (c) a code (for example, a number) which represents the duration of the audio or audio-visual work being re-broadcast (sent to Work Streamer 3200). In accordance with the present invention, RBID 3700 computes the RBI by applying one of a number of formulas. In the preferred embodiment of the present invention, the following formula is used:

$$RBI = \text{Duration of audio or audio-visual work}/(\text{No. of re-broadcast offset channels}) \quad (5)$$

As yet still further shown in FIG. 7, Multicaster 3300 receives, as input: (a) a data stream (the Time-Division Multiplexed composite signal) from Work Streamer 3200 and (b) client information (for example, control and destination) from Request Processor 3500. Multicaster 3300 produces, as output, data (for example, message packets) directed toward particular clients for re-broadcast on a network such as the Internet, WAN, LAN, etc. In accordance with the present invention, Multicaster 3300 manages a list of all clients that should receive data from particular portions of the TDM composite signal in accordance with any one of a number of methods which are well known to those of ordinary skill in the art. Then, whenever the particular portion of data in the TDM composite signal is received from Work Streamer 3200, Multicaster 3300 sends the particular portion of data to all clients (recipients) in the list who are to receive the particular portion of data (also known as multicasting). Many methods for broadcasting a portion of data from a data stream (for example, a Time-Division Multiplexed composite signal) to multiple recipients are well known to those of ordinary skill in the art. Control information from Request Processor 4500 is used in accordance with methods that are well known to those of ordinary skill in the art to modify the list of recipients, for example, to add a recipient, or to remove a recipient from the list of destinations when the recipient no longer desires to receive data from the server.

As yet again still further shown in FIG. 7, Request Processor 3500 receives, as input, requests for data from clients connected via Network 3990 (for example, an Internet, WAN, LAN, or the like). In response, Request Processor 3500 produces, as output, information identifying the client and appropriate re-broadcast control information such as, for example, "request data that is identified by an appropriate data identifier," "disconnect," and other messages that are used to obtain data from embodiment 3000. It should be clear to those of ordinary skill in the art, that such information identifying the client and appropriate re-broadcast control information may be obtained: (a) by dialogs between the client and Request Processor 3500 in accordance any one of many methods that are well known to those of ordinary skill in the art including, without limitation, by use of forms that are contained on web pages that are transmitted to the client over Network 3990 in accordance any one of the many methods that are well known to those of ordinary skill in the art.

Although FIG. 7 shows embodiment 3000 to be comprised of separate modules, in a preferred embodiment, the modules are embodied as software programs or modules which run on a general purpose computer such as, for example, a personal computer. It should be well known to one of ordinary skill in the art, in light of the etailed description above, how to implement these programs or modules in software.

Conversely, components of embodiment 4000 may exist in separate locations connected to one another by a network or any other communication means (where the use of the term means is used in the broadest sense possible).

In accordance with this embodiment of the present invention, an audio or audio-visual work is encoded into data that is later decoded to recreate the original audio or audio-visual work. Those of ordinary skill in the art should readily appreciate that the amount of data that represents a particular portion of the audio or audio-visual work can be transmitted, re-broadcast, and/or accessed from Storage Device 3100 in a time interval that is significantly less than the playback time interval of the particular portion. FIG. 8A shows the playback time of segments (Seg0, Seg1, . . . , SegN) of an original audio or audio-visual work, plotted along time axis 3001. The segments are encoded as data in accordance with methods that are well known to those of ordinary skill in the art, and the transmission times for the encoded data blocks (D0, D1, . . . , DN) which correspond to the segments (Seg0, Seg1, . . . , SegN) are shown along time-axis 3002. The time of receipt of the transmitted encoded data blocks (D0, D1, . . . , DN) are plotted along time axis 3003. As should be clear to those of ordinary skill in the art, the encoded data blocks (D0, D1, . . . , DN) are received after an arbitrary transmission delay through Network 3990. Lastly, after decoding, the segments (Seg0, Seg1, . . . , SegN) of the reconstructed audio or audio-visual work are plotted along time-axis 3004. Many methods are well known to those of ordinary skill in the art for encoding and decoding audio or audio-visual works.

Since, as discussed above, the transmission time of data that represents a particular portion of an audio or audio-visual work is generally smaller than the playback time interval of the particular portion, two or more audio or audio-visual works can be transmitted across a network by interleaving or Time-Division Multiplexing (TDM) the data representing the two audio or audio-visual works. Many methods are well known to those of ordinary skill in the art for interleaving and Time-Division Multiplexing data representing audio or audio-visual works during transmission across a network. In the preferred embodiment of the present invention, Time-Division Multiplexing is used to transmit data to Multicaster 3300. In particular, Work Streamer 3200 accesses data from Storage Device 3100, and outputs a TDM stream of data to Multicaster 3300.

In accordance with the preferred embodiment of the present invention, the audio or audio-visual work is divided into segments that are encoded as data for efficient storage and transmission. The encoded data representing an interval of the media work will be referred to as a "work-encoded-data-block." FIG. 8B shows, in graphical form, a composition and transmission method utilized by Work Stream 3200 to form and transmit a TDM composite signal to Multicaster 3300 of embodiment 3000 shown in FIG. 7 of embodiment 3000. As shown in FIG. 8B, time axis 3010 shows the playback time of segments (Seg0, Seg1, . . . , Seg5) of the audio or audio-visual work being re-broadcast. Seg0 corresponds to the first segment of the audio or audio-visual work. Thus, time axis 3010 corresponds to a re-broadcast of the work that starts at the origin of the time axis (hence its designation as offset 0). Below time axis 3010 is shown the TDM transmit interval of a work-encoded-data-block that corresponds to the segment below which it appears (i.e., the time it takes to transmit the data). As discussed above, the time to transmit the corresponding work-encoded-data-block is less than the playback time of the segment. As further shown in FIG. 8B, time axis 3020 shows the playback time of segments (Seg5, Seg0, . . . , Seg4) of the audio or audio-visual work being re-broadcast. Seg0 corresponds to the first segment of the audio or audio-visual work. Thus, time axis 3020 corresponds to a re-broadcast of the work that starts offset from the origin of the time axis by one Re-broadcast Interval ("RBI") (hence its designation as offset 1). Below time axis 3020 is shown the TDM transmit interval of a work-encoded-data-block which corresponds to the segment below which it appears (i.e., the time it takes to transmit the data). However, it is offset in time by an amount equal to the time it takes to transmit the work-encoded-data-block corresponding to segment SEG0 from the offset 0 data stream.

Thus, in accordance with the present invention, the re-broadcasts of the audio or audio-visual work are labeled: offset 0 stream, offset 1 stream, offset 2 stream, and so forth (along time axes 3010–3060) and the various offset streams represent re-broadcasts of the audio or audio-visual work at regular time intervals, which are referred to as Re-broadcast Intervals ("RBI"). That is, the starting times for the particular audio or audio-visual work being re-broadcast are offset at regular intervals, RBI, with the start of the re-broadcast of the audio or audio-visual work being denoted by Seg0 in each of the offset data streams shown in FIG. 8B).

In accordance with the preferred embodiment of the present invention, Work Streamer 3200 transmits composite signal 3065 (as Shown in FIG. 8B) to Multicaster 3500. As shown in FIG. 8B, composite signal 3065 is a TDM signal that is made up of TDM frames (this type of Time-Division Multiplexing is well known to those of ordinary skill in the art and many methods are well known to those of ordinary skill in the art for forming such a signal). As further shown in FIG. 8B, each TDM frame of composite signal 3065 comprises a work-encoded-data-block from each of the offset streams 0–5, wherein each of the work-encoded-data-blocks is offset in time for the time it takes to transmit a work-encoded-data-block. As one can readily appreciate, each TDM frame thereby comprises a work-encoded-data-block from each of the re-broadcasts in the appropriate time slot within the TDM frame. As should be well understood by those of ordinary skill in the art, the work-encoded-data-blocks are created by Work Streamer 3200 at the appropriate TDM transmit interval (as indicated on FIG. 8B) by sending appropriate signals to Storage Device 3100 at regular intervals. Note that the TDM transmission interval for each of re-broadcast offset streams 0–5 occurs at a unique time offset from the start of the TDM Frame. Advantageously, this enables multiple re-broadcasts of the audio or audio-visual work to be sent Multicaster 3300 in a TDM format. Further in accordance with the preferred embodiment of the present invention, the use of a TDM composite signal enables interleaved data access to Storage Device 3100 to provide greater performance in many storage devices of the type that are well known to those of ordinary skill in the art. It should also be noted that, even though it has been depicted in this manner for sake of ease of understanding the present invention in FIG. 8B, the transmission time required to send a work-encoded-data-block during a particular time slot may not consume the entire time slot interval.

It should be understood that although the preferred embodiment of the present invention utilizes a TDM composite signal, the invention is not thereby restricted and includes embodiments wherein other methods utilizing multiple streams and/or multiple storage devices, for example, one stream and perhaps one storage device for each re-broadcast, can be employed to send data from Work Streamer 3200 to Multicaster 3300. It should be clear that the TDM composite signal can have a number of channels that is bounded by the ability of the system to broadcast to clients without the clients noticing a lapse in transmission (of course this cannot account for nondeterministic delays in the network). If a larger number of channels is needed to handle the predetermined broadcasts than can be handled by the system without lapses, one could, for example, create multiple TDM composite signals to handle the extra load.

FIG. 9A shows a graph of location of a segment (offset from an origin) of the audio or audio-visual work being re-broadcast by embodiment 3000 shown in FIG. 7 as a function of time. As shown in FIG. 9A, during transmission of data at normal playback rates, the locations of segments of the audio or audio-visual work being broadcast as a function of time form a line having slope which represents the playback rate (a "normal" playback rate corresponding to a slope of 1) and an intercept on the time axis at the re-broadcast start time of the particular re-broadcast of the audio or audio-visual work. Data streams 3110–3140 shown in FIG. 9A have the same playback rates (and therefore the same slope), but are offset from one another since they have different re-broadcast start times. Note that at any particular time along the horizontal time axis multiple segments from different portions of the audio or audio-visual work are being re-broadcast simultaneously. This is seen by drawing a vertical line that intersects the horizontal time axis at a particular time.

As further shown in FIG. 9A, at 2 time units from the start of the re-broadcast of data stream 3110 (offset 0 data stream), client A0 sends a request to embodiment 3000 to begin viewing the particular audio or audio-visual work being re-broadcast. Client A0 must wait for the next re-broadcast to begin before receiving data (as shown in FIG. 9A, the next re-broadcast starts at the temporal location denoted by RBI). Thus, client A0 must wait 8 time units before receiving media or other data requested from data stream 3120 (offset 1 data stream). Similarly, if client A1 sends a request to begin viewing the particular audio or audio-visual work being re-broadcast 7 time units after the start of the re-broadcast of data stream 3110 (offset 0 data stream), client A1 has to wait 3 time units before receiving media or other data requested from data stream 3120 (offset 1 data stream).

Figure 10:
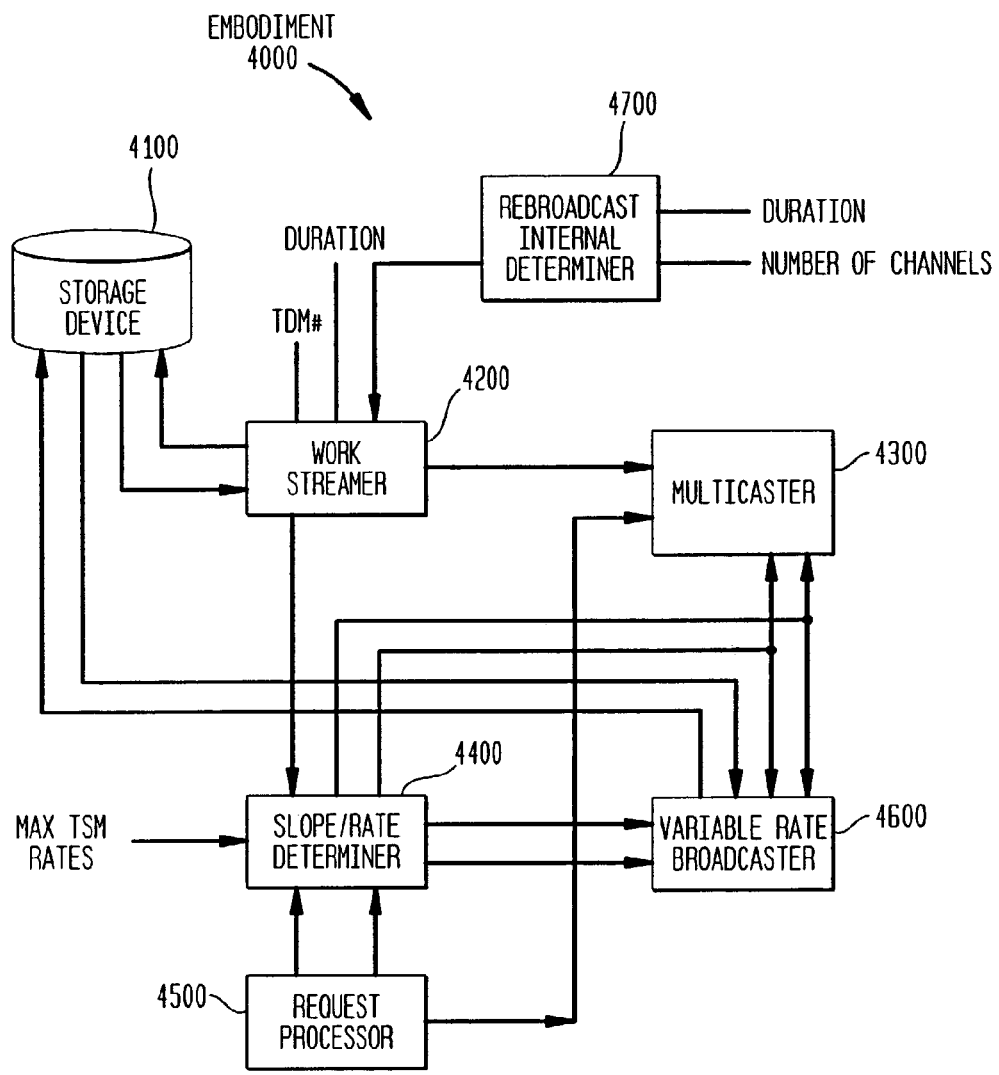
FIG. 10 shows a block diagram of embodiment 4000 of the present invention that transitions asynchronously arriving requests to receive a particular audio or audio-visual work to synchronous re-broadcasts of the audio or audio-visual work.

FIG. 10 shows a block diagram of embodiment 4000 of the present invention that transitions asynchronously arriving requests to receive a particular audio or audio-visual work to synchronous re-broadcasts of the audio or audio-visual work. First, for ease of understanding the present invention, a general description of how embodiment 4000 operates is given with reference to FIG. 9A. In accordance with the present invention, embodiment 4000 causes the client to be joined to a data stream whose re-broadcast start time is closest (temporally) to the arrival of the client's request. Thus, in accordance with the present invention, for client A0, embodiment 4000 determines that the arrival time of the request to begin viewing is closest to the re-broadcast start time of data stream 3110 (note that the re-broadcast time of data stream 3110 has already occurred). Embodiment 4000 then begins re-broadcasting data to client A0 at 5/3 the normal rate, i.e., at an accelerated rate. In accordance with the present invention, transmission at the accelerated rate enables client A0 to "catch up" to the normal re-broadcast location in the audio or audio-visual work 5 time units after the re-broadcast start time of data stream 3110. In response to receiving data at the accelerated rate, the client (or the client's server) automatically initiates playback at an appropriate rate to keep its arrival or capture buffer from overflowing, for example, in accordance with aspects of the present invention that have been described in detail above. In an alternative embodiment of the present invention, instead of having the client determine the accelerated rate required by its playback system to avoid an overflow of the data received, the accelerated rate is transmitted to the client by embodiment 4000 when transmission is starts.

Next, in accordance with the present invention, whenever embodiment 4000 determines that the stream of data being re-broadcast to client A0 relates to the same playback position as data stream 3110, embodiment 4000 sends client A0 data at the normal rate from data stream 3110. Advantageously, in accordance with the present invention, overhead on embodiment 3000, and the corresponding components of embodiment 4000, is reduced since, as will be explained in detail below, the client now receives data from Multicaster 4300 and no additional accesses to Storage Device 4100 or Work Streamer 4200 are required to provide data to the client. Additionally, as will be described in detail below, once the transition to the offset stream has occurred, the client no longer consumes resources Variable Rate Broadcaster 4600.

In a similar manner to that described above, in accordance with the present invention, for client A1, embodiment 4000 determines that the arrival time of the request to begin viewing is closest to the re-broadcast start of data stream 3120 (note that the re-broadcast time of data stream 3120 has yet to occur). Embodiment 4000 then begins re-broadcasting data to client A1 at 5/8 the normal rate, i.e., at a reduced rate. In accordance with the present invention, transmission at the reduced rate enables client A1 to reach the normal re-broadcast location in the audio or audio-visual work 5 time units after the re-broadcast start time of data stream 3120. In response to receiving data at the reduced rate, the client (or the client's server) automatically initiates playback at an appropriate rate to keep its arrival or capture buffer from emptying, for example, in accordance with aspects of the present invention that have been described in detail above. In an alternative embodiment of the present invention, instead of having the client determine the reduced rate required by its playback system to avoid emptying, the reduced rate is transmitted to the client by embodiment 4000 when transmission is started.

Next, in accordance with the present invention, whenever system 4000 determines that the stream of data being re-broadcast to client A1 relates to the same playback position as data stream 3120, embodiment 4000 sends client A1 data at the normal rate from stream 3120. Advantageously, in accordance with the present invention, overhead on embodiment 3000, and the corresponding components of embodiment 4000, is reduced since, as will be explained in detail below, the client now receives data from Multicaster 4300 and no additional accesses to Storage Device 4100 or Work Streamer 4200 are required to provide data to the client. Additionally, as will be described in detail below, once the transition to the offset stream has occurred, the client no longer consumes resources Variable Rate Broadcaster 4600.

We now return to a detailed description of embodiment 4000. As shown in FIG. 10, Storage Device 4100 is a storage device of a type which is well known to those of ordinary skill in the art. Storage Device 4100 stores a representation (preferably a digital representation or any representation that can be converted to a digital representation in accordance with methods which are well known to those of ordinary skill in the art) of an audio or audio-visual work or data of interest to a user (such as a stream of stock quotes, market data, advertisements, and so forth). Storage Device 4100 receives, as input: (a) data requests from Work Streamer 4200; data requests from Variable Rate Broadcaster 4600. Storage Device 4100 provides, as output, the data requested.

As further shown in FIG. 10, Work Streamer 4200 receives as input: (a) a code (for example, a number) which represents a desired Re-broadcast Interval ("RBI") from Re-broadcast Interval Determiner 4700; (b) a code (for example, a number) which represents a desired number of Time-Division Multiplexed (TDM) channels; (c) a code (for example, a number) which represents the duration of the audio or audio visual work being re-broadcast; and (d) data transmitted from Storage Device 4100. Work Streamer 4200 produces, as output: (a) a Time-Division Multiplexed composite signal as described above (this is applied as input to Multicaster 4300) and (b) a stream of information that provides the playback position and time offset of each time-offset re-broadcast stream of the work (this is applied as input to Slope/Rate Determiner 4400).

As still further shown in FIG. 10, Re-broadcast Interval Determiner ("RBID") 4700 receives, as input, (a) a code (for example, a number) which represents the duration of an audio or audio/visual work being re-broadcast and (b) a code (for example, a number) that represents the number of re-broadcast offset channels, and produces, as output, data representing the duration of the re-broadcast interval ("RBI"). In accordance with the present invention, Re-broadcast Interval Determiner 4700 computes the RBI by applying one of a number of formulas. In the preferred embodiment of the present invention, the following formula is used:

RBI=Duration of audio or audio-visual work/(No. of re-broadcast offset channels    (6)

As yet still further shown in FIG. 10, Slope Rate Determiner ("SRD") 4400 receives as input: (a) data representing start times for each offset data stream of the audio or audio visual work being re-broadcast from Work Streamer 4200; (b) arrival times and client identification information from Request Processor 4500; and (c) a set of parameters representing maximum allowable Time-Scale Modification rates (or slopes). SRD 4400 produces as output: (a) client identification information for the client requesting the data (applied as input to Variable Rate Broadcaster 4600 "VRB 4600" and Multicaster 4300); (b) an identification of the re-broadcast offset data stream the client will be synchronized or merged with (applied as input to VRB 4600); (c) an indication of the time it will take before the synchronization or merge takes place ("duration to intercept") (applied as input to VRB 4600 and Multicaster 4300); and (d) a slope, which represents the playback rate (this slope or playback rate is applied as input to VRB 4600). In accordance with the present invention, SRD 4400 determines the re-broadcast offset data stream whose start time is temporally closest to the arrival time of the client's request by computing the distance forward and backward in time to the previous offset stream start time and the next offset stream start time (with respect to the arrival time), and choosing the smaller of the forward and backward times. Next, SRD 4400 computes a client playback slope that is greater than 1.0 if "catching-up" to a future playback intercept position in an offset stream already started, or a client playback slope that is less than 1.0 to "slow-down" to a future playback intercept position in an offset stream which will start in the future. The actual slope can be determined by a number of factors such as the utilization of VRB 4600 (if a higher slope is used, there is a greater load since data must be sent faster), and the maximum allowable Time-Scale Modification rate. In most cases slope values will be between ½ and 2.0, and can be calculated: (a) by computing a desired playback position change per unit time; (b) by accessing a pre-computed look-up table; or (c) any other method of choosing a reasonable slope, such as, by client input relating to the speed of the "catch-up." The "duration to intercept" is calculated by subtracting the time that data transmission to the client is initiated from the time interval at which the playback positions of VRB 4600 and the target offset stream are identical. The "duration to intercept" information is used to signal VRB 4600 when it must end transmission to the client and to signal Multicaster 4300 when it must initiate transmission of the appropriate offset stream.

As yet again still further shown in FIG. 10, VRB 4600 receives as input: (a) data from Storage Device 4100; (b) a slope or playback rate from SRD 4400; (c) client identification information for the client requesting the data from SRD 4400; (d) an identification of the re-broadcast offset data stream the client will be synchronized or merged with; and (e) "duration to intercept" from SRD 4400. VRB 4600 obtains the specified data received from Storage Device 4100 and broadcasts it to the identified client at the specified rate for an amount of time equal to the "duration to intercept" and then stops sending data for that client. VRB 4600 produces as output a stream of data sent to the identified client via a network such as the Internet or Intranet and so forth.

As yet still further shown in FIG. 10, Multicaster 4300 receives as input: (a) a data stream (the Time-Division Multiplexed composite signal) from Work Streamer 4200; (b) client information (control and destination) from Request processor 4500; (c) client identification information for the client requesting the data from SRD 4400; and (d) "duration to intercept" information from SRD 4400. Multicaster 4300 produces, as output, data (for example, message packets) directed toward particular clients for clients for re-broadcast on a network such as the Internet, WAN, LAN, etc. In accordance with the present invention, Multicaster 4300 manages a list of all clients that should receive data from particular portions of the TDM composite signal in accordance with any one of a number of methods which are well known to those of ordinary skill in the art. Then, whenever the particular portion of data in the TDM composite signal is received from Work Streamer 4200, Multicaster 4300 sends the particular portion of data to all clients (recipients) in the list who are to receive the particular portion of data (also known as multicasting). Many methods for broadcasting a portion of data from a data stream (for example, a Time-Division Multiplexed composite signal) to multiple recipients are well known to those of ordinary skill in the art. Control information from Request Processor 4500 are used in accordance with methods that are well known to those of ordinary skill in the art to modify the list of recipients, for example, to add a recipient, or to remove a recipient from the list of destinations when the recipient no longer desires to receive data from the server. The "duration to intercept" and client information from SRD 4400 is used to notify Multicaster 4300 when clients previously receiving data from VRB 4600 should begin receiving data from one of the offset streams.

Lastly, Request Processor 4500 receives, as input, requests for data from clients connected via a network (for example, an Internet, WAN, LAN, or the like). In response, Request Processor 4500 produces, as output, information identifying the client and the appropriate re-broadcast control information such as, for example, "request data that is identified by an appropriate data identifier," "disconnect," and other messages that are used to obtain data from embodiment 4000. It should be clear to those of ordinary skill in the art, that such information identifying the client and appropriate re-broadcast control information may be obtained: (a) by dialogs between the client and Request Processor 4500 in accordance any one of many methods that are well known to those of ordinary skill in the art including, without limitation, by use of forms that are contained on web pages that are transmitted to the client over a network in accordance any one of the many methods that are well known to those of ordinary skill in the art.

Although FIG. 10 shows embodiment 4000 to be comprised of separate modules, in a preferred embodiment, the modules are embodied as software programs or modules which run on a general purpose computer such as, for example, a personal computer. It should be well known to one of ordinary skill in the art, in light of the detailed description above, how to implement these programs or modules in software.

Conversely, components of embodiment 4000 may exist in separate locations connected to one another by a network or any other communication means (where the use of the term means is used in the broadest sense possible).

To better understand the operation of embodiment 4000 described above, FIG. 9B shows a graph of work-encoded-data-block number (offset from an origin) of the audio or audio-visual work being re-broadcast by embodiment 4000 as function of time. As shown in FIG. 9B, during transmission of data at normal playback rates, the work-encoded-data-blocks of the audio or audio-visual work being re-broadcast as a function of time, form a line having slope 1 and an intercept on the time axis at the re-broadcast start time of the particular broadcast of the work. As further shown in FIG. 9B, data streams 3110 and 3120 are offset from one another, i.e., they are data streams having different "re-broadcast start-times." However, data streams 3110 and 3120 have the same playback rate, i.e., the same slope in FIG. 9B, but different intercepts on the time axis corresponding to their different start times. As discussed above, streams transmitted at a normal rate have slope 1.

As further shown in FIG. 9B, the work-encoded-data-blocks sent by VRB 4600 of embodiment 4000 are identical to the work-encoded-data-blocks sent by Multicaster 4300 of embodiment 4000, but are simply broadcast with a different time interval between the work-encoded-data-blocks. This means that VRB 4600 sends the same work-encoded-data-blocks that Multicaster 4300 sends, but adjusts the time interval between transmissions of the work-encoded-data-blocks in order to "catch-up to" or "wait-for" the stream of data blocks sent by Multicaster 4300. If the client request is received between (n)RBI and (n+½)RBI (less than the half-way point, in time, between the nth and the (n+1)st re-broadcast start time), the inter-transmission interval is shortened to catch-up to an intersection point in the previous offset stream (note the data transmitted for path 3111 has the same work-encoded-data-blocks as path 3110, but spaced closer together in time). If the client request is received between (n+½)RBI and (n+1)RBI (more than the half-way point, in time, between the nth and the (n+1)st re-broadcast start time), the inter-transmission interval is lengthened to wait for an intersection point with the next offset stream (note the data transmitted for path 3121 has the same work-encoded-data-blocks as path 3120, but spaced further apart in time). Note that, in accordance with the present invention, only the initial portion of the audio or audio-visual work is broadcast by VRB 4600, and thus VRB 4600 can cache the work-encoded-data-blocks from the initial portion of the work to further reduce the number of accesses to Storage Device 4100. There are many methods and apparatus that are well known to those of ordinary skill in the art for caching data, such as, for example, SRAM, DRAM, or small capacity hard disks.

Then, in accordance with the present invention, once embodiment 4000 (or the transmitting server) determines that the stream of data being broadcast to client A1 is accessing the same playback position during the same time interval as stream 3120, the server sends the client data at the normal rate from stream 3120 and the overhead on the media server is reduced. In the preferred embodiment the duration to intercept is used to identify the time at which the stream from VRB 4600 and Multicaster 4300 will intercept and when the responsibility of transmitting data to the client should transition from VRB 4600 to Multicaster 4300.

Although aspects of the present invention have been described in the context of aligning or synchronizing to one of several, offset, re-broadcast data streams, it should be clear that the present invention is not limited to time alignment of re-broadcasted works. In fact, embodiments of the present invention may also be used to align or synchronize with (catch up), for example, live broadcasts by storing or time shifting an audio or audio-visual work that is broadcast only once. For example, in digital VCRs or televisions that contain digital storage for spooling live broadcasts, a user may watch a live broadcast and invoke a "Pause" function (by, for example, pressing a "pause and record" button) to stop playback and initiate recording of the one-time broadcast audio or audio-visual work. In response, the one-time broadcast audio or audio-visual work is recorded from the point where the Pause function was invoked to the end of the audio or audio-visual work. As should be clear, this enables a user to turn to other tasks. After the user is ready to return to the work, playback is resumed at the location where the "Pause" was initiated by playing the recorded copy of the one-time broadcast. This playback is said to be "time-shifted" since the playback time differs from the one-time broadcast time. In prior art devices, there is no mechanism to catch up to the one-time broadcast without deleting or skipping some portion of the time-shifted copy of the audio and/or audio-visual work in the broadcast. However, embodiments of the present invention, can be used to catch-up to the live one-time broadcast by computing the playback rate required to catch-up in a predetermined interval, such as a commercial break, program boundary, or the like. In this manner users watching a time-shifted version can "catch-up" to a live broadcast after they have paused their viewing devices.

FIG. 9C shows a graph of position (offset from an origin) of an audio or audio-visual work being received by a media playback device that incorporates storage of the audio or audio-visual work, such as, for example a digital VCR, hard-disk based VCR, and the like. As shown in FIG. 9C, a one-time live broadcast (4001) is being viewed as it is broadcast. At time Tp, the user invokes the Pause function. As previously described, the one-time live broadcast is recorded after invoking the Pause function. At time Tr, the user resumes viewing at the same location in the work where the Pause function was invoked. However, the user is behind the live broadcast. Using the inventive method and apparatus previously described with respect to embodiment 4000, the user specifies the amount of time desired to transition back to the one-time live broadcast (received by Request Processor 4500), and apparatus, similar to Slope/Rate Determiner 4400, computes a Time-Scale Modification Rate, or Playback Rate, that will transition the user to the one-time live broadcast during the specified interval. The intercept interval computed by embodiment 4000 determines the time at which the media playback device may discontinue recording of the one-time live broadcast, since after the intercept interval, the user will be viewing the one-time live broadcast as it is received. As shown in FIG. 9C, time Tv marks the time at which the user will again be viewing the live broadcast. The time interval from Tr to Tv defines the transition period during which the user will be watching a Time-Scale compressed (or speeded-up) version of the recorded material. The time interval from Tp to Tv defines the interval of the one-time live broadcast which must be recorded in order to provide a seamless transition to the live-broadcast from a time-shifted viewing reference.

Note that upon intersecting with the one-time live broadcast, there is no longer a need to continue recording the work, and this process is stopped. The ability of embodiment 4000 to merge with or "catch-up" to a one-time live broadcast of a work from a time-shifted copy of the work that has been recorded significantly reduces the amount of the work which must be stored or recorded. This reduction further reduces the required storage resources required.

Figure 11A:
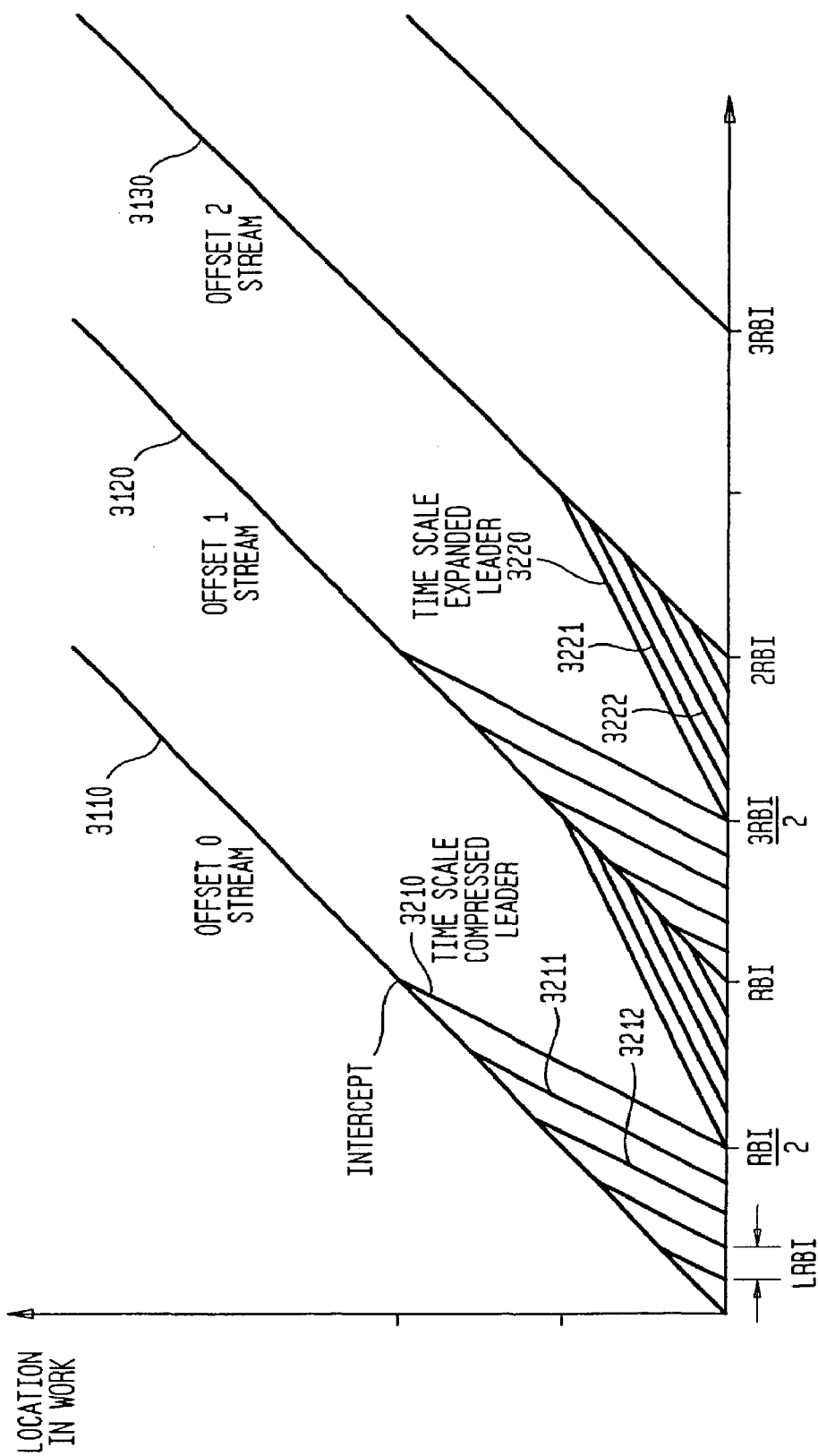
FIG. 11A shows a graph of location (offset from an origin) of an audio or audio-visual work being re-broadcast by embodiment 5000 shown in FIG. 12 as a function of time in accordance with the further aspect of the present invention.

In accordance with a further aspect of the present invention, system overhead for serving requests from clients that arrive during intervals between the start of re-broadcasts of a particular audio or audio-visual work is further reduced. In accordance with this further aspect of the present invention, portions of the audio or audio-visual work being broadcast are Time-Scale Modified at two rates: one rate is faster than normal speed and one rate is slower than normal speed. These slow-rate and fast-rate broadcast portions of the audio or audio-visual work are re-broadcast during an interval from the start of re-broadcast of the work to a point X during the broadcasting of the work, which point X is a function of the re-broadcast interval and the amount of Time-Scale Modification performed. These portions will be referred to as Time-Scaled Leaders. FIG. 11A shows a graph of location (offset from an origin) of an audio or audio-visual work being re-broadcast by embodiment 5000 shown in FIG. 12 as a function of time in accordance with the further aspect of the present invention. As shown in FIG. 11A, embodiment 5000 (TSM System 5400 of embodiment 5000 shown in FIG. 12) time compresses the first 10 time units of the audio or audio-visual work and creates a new data stream 3210 which has duration 5 units and a playback rate of 2. Note that only 10 time units of the beginning of the original audio or audio-visual work are time-scale compressed. Next, as shown in FIG. 11A, embodiment 5000 (TSM System 5400 of embodiment 5000 shown in FIG. 12) time-expands the first 5 time units of the work and creates a new data stream 3220 which has duration 10 units and playback rate of 1/2. Note that only 5 time units of the beginning of the original audio or audio-visual work are time-scale expanded. As further shown in FIG. 11A, playback of either of these two data segments 3210 and 3220 may begin at the midpoint of the interval between re-broadcast start times (RBI/2), and, upon reaching the end of each Time-Scale Modified data stream, the client will be at the same segment location of the audio or audio-visual work being re-broadcast on an earlier or later offset data stream, respectively. In the preferred embodiment, segments (labeled 3211, 3212) of the single time-scale compressed leader 3210 are used to merge with the previous offset stream from starting times between (n)RBI and (n)(RBI/2) as shown in FIG. 11A. Similarly, segments (labeled 3221, 3222) of the single time-scale expanded leader 3220 are used to merge with the next offset stream from starting times between (n)(RBI/2) and RBI(n+1) as shown in FIG. 11A.

As is readily apparent from FIG. 11A, in accordance with the present invention, further, smaller time-scale compressed and time-scale expanded portions of the audio or audio-visual work are re-broadcast from times between the midpoint of the re-broadcast interval, and merge with the offset streams. In the preferred embodiment segments of the time-scale compressed leader and segments of the time-scale expanded leader are broadcast from starting times other than the offset stream start-times and merge with the offset streams. The interval between re-broadcasts of the Time-Scale Modified Leaders is Leader Re-broadcast Interval (LRBI), which LRBI can be selected by embodiment 5000. In accordance with a preferred embodiment of the present invention, as shown in FIG. 11A, re-broadcasts of the time-scale compressed leader and time-scale expanded leader may be accomplished utilizing the technique of Time-Division Multiplexing for further efficiency.

Advantageously, in accordance with this aspect of the present invention, there is no need to compute playback rates, and a media server needs only: (a) to select a Time-Scale Modified Leader to send to the client and (b) to manage a transition from the Time-Scale Modified Leader to a data stream being transmitted at normal speed when appropriate. Thus, in accordance with this aspect of the present invention, SRD 4400 and VRB 4600 of embodiment 4000 are replaced with a Time-Scaled Leader Duration Determiner, Time-Scale Modification apparatus, and apparatus for streaming and multicasting the Time-Scale Modified Leaders. In accordance with the preferred embodiment of the present invention, the Time-Scale Modified Leaders are re-broadcast at regular intervals separated in time by an amount LRBI.

Although the inventive technique has been described using two time-scale modified leaders and segments thereof, the invention is not thusly limited and embodiments using leaders with unique TSM rates (playback rates) are possible. In addition, multiple TSM leaders with different start times and different TSM rates may share a common intercept point in the work.

FIG. 11B shows, in graphical form, encoding portions of a Time-Scale Modified audio or audio-visual work to form Time-Scale Modified Leaders. Playback time of segments (Seg0, Seg1, . . . , SegN) of an original audio or audio visual work are plotted along time axis 4037. These segments are encoded as data in accordance with methods that are well known to those of ordinary skill in the are, and the transmission times for work-encoded-data-blocks (D0, D1, . . . , DN) which correspond to the segments (Seg0, Seg1, . . . , SegN) are shown along time axis 4039. Playback time of segments (Seg0, Seg1, . . . , SegN) for a time-scale compressed leader (compresses by a factor of 2) are shown along time-axis 4041. These segments are encoded as data, and the transmission times for work-encoded-data-blocks (D0, D1, . . . , DN) which correspond to the segments (Seg0-Seg1, Seg2-Seg3, . . . ) are shown along time axis 4043. Lastly, playback time of segments (Seg0, Seg1, . . . , SegN) for a time-scale expanded leader (expanded by a factor of 2) are shown along time-axis 4045. These segments are encoded as data, and the transmission times for work-encoded-data-blocks (D0, D1, . . . , DN) which correspond to the segments (Seg0/2, Seg0/2, Seg1/2, Seg1/2, . . . ) are shown along time axis 4047.

Figure 12:
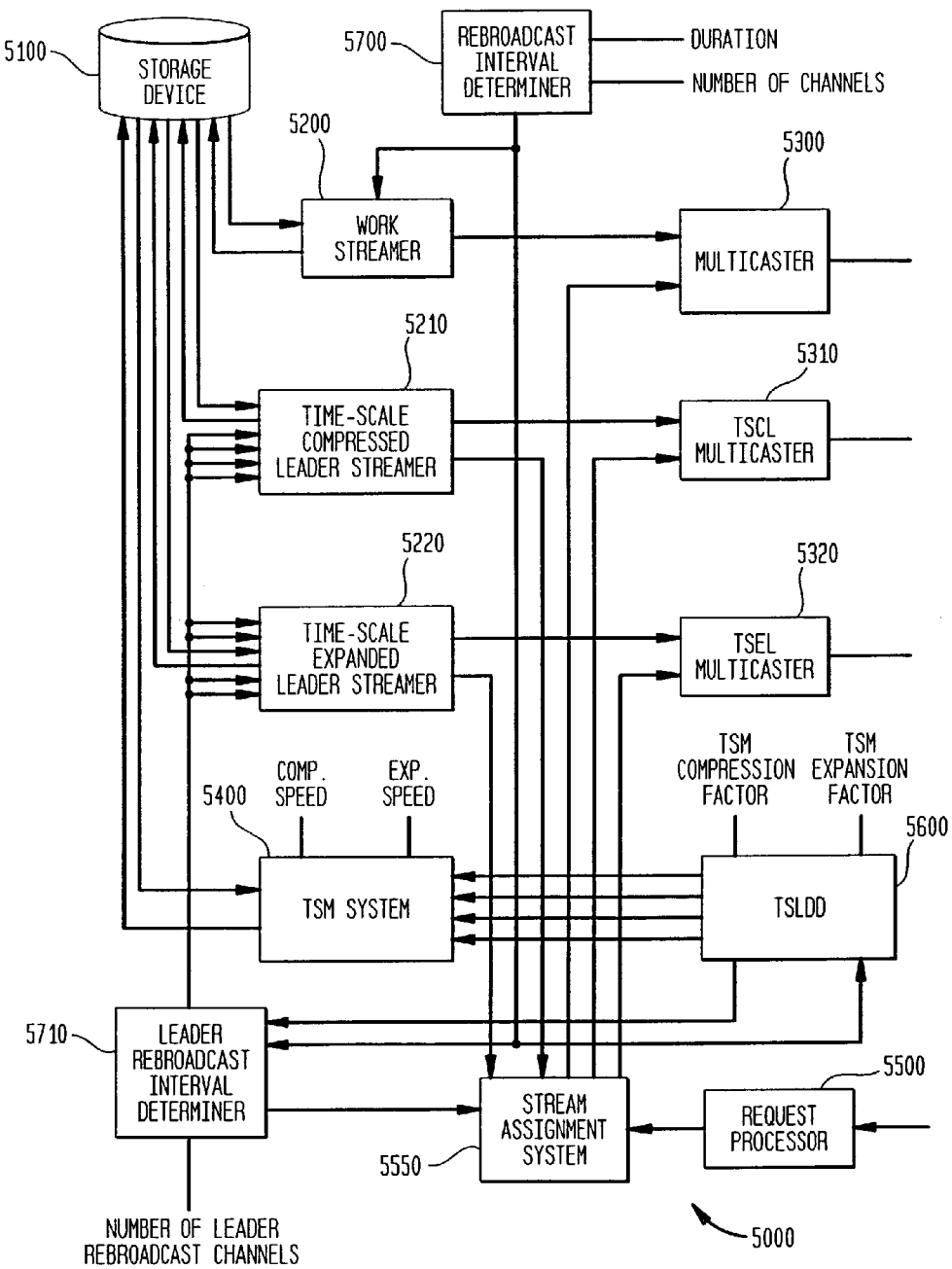
FIG. 12 shows a block diagram of embodiment 5000 of the present invention which: (a) transmits Time-Scale Modified Leaders; (b) joins re-broadcast offset streams of an audio or audio-visual work; and (c) transmits offset streams of an audio or audio-visual work.

FIG. 12 shows a block diagram of embodiment 5000 of the present invention which: (a) transmits Time-Scale Modified Leaders; (b) joins re-broadcast offset streams of an audio or audio-visual work; and (c) transmits offset streams of an audio or audio-visual work. As shown in FIG. 12, Re-broadcast Interval Determiner (RBID) 5700 receives, as input: (a) a code (for example, a number) which represents the duration of an audio or audio-visual work being re-broadcast and (b) a code (for example, a number) that represents the number of re-broadcast offset channels. RBID 5700 produces, as output, data representing the duration of the re-broadcast interval ("RBI"). The RBI is applied as input to Work Streamer 5200, Leader Re-broadcast Interval Determiner 5710, and Time-Scaled Leader Duration Determiner ("TSLDD") 5600. In accordance with the present invention, RBID 5700 computes the RBI by applying one of a number of formulas. In the preferred embodiment, the following formula is used:

$$RBI = \text{Duration of audio or audio-visual work}/(\text{No. of re-broadcast offset channels}) \quad (7)$$

Work Streamer 5200 and Multicaster 5300 are identical to Work Streamer 4200 and Multicaster 4300, respectively, which were described above with respect to embodiment 4000 shown in FIG. 10.

As further shown in FIG. 12, TSLDD 5600 receives as input: (a) RBI (from RBID 5700); (b) a user defined parameter representing the time-scale compression (or speed-up) rate to use; and (c) a user defined parameter representing the time-scale expansion (or slow-down) rate to use. In response, TSLDD 5600 produces, as output, the maximum time interval of the input audio or audio-visual work that will be required for creation of time-scale-compressed leaders and time-scale expanded leaders (applied as input to TSM System 5400). TSLDD 5600 computes the time interval of the original audio or audio-visual work that will be time-scale compressed to form a time-scale compressed leader and the time interval of the original audio or audio-visual work that will be time-scale expanded to form a time-scale expanded leader by applying the following formulas:

Speed-up:

$$T\text{do} = (I/2)(\text{Speed}/(\text{Speed}-1)) \quad (8)$$

where: Tdo=Time Interval of the original audio or audio-visual work to be time-scale compressed; Speed=speed-up factor (i.e. <1)=1/time-compression factor; and I=Re-broadcast interval.

Slow-down:

$$T\text{do} = (I/2)(\text{Speed}/(1-\text{Speed})) \quad (9)$$

where: Tdo=Time Interval of the original audio or audio-visual work to be time-scale expanded; Speed=slow-down factor (i.e. <1)=1/time-expansion factor; and I=Re-broadcast interval.

As one can readily appreciate from the above, for speed-up by a factor of 2 (i.e., time-compression by ½) and slow-down by a factor of ½ (i.e., time-expansion by 2), the time-compressed leader is obtained from a segment of the original audio or audio-visual work which starts at the beginning of the audio or audio-visual work and has a time interval equal to the re-broadcast interval. The time-expanded leader is obtained from a segment of the original audio or audio-visual work which starts at the beginning of the audio or audio-visual work and has a time interval equal to ½ the re-broadcast interval. This can also be understood as described above with respect to FIG. 11A.

As shown in FIG. 12, Time-Scale Modification System (TSMS) 5400 receives as input: (a) data from Storage Device 5100 representing the original audio or audio-visual work; (b) the time interval of the original audio or audio-visual work required to generate time-scale compressed leaders (from TSLDD 5600); (c) the time interval of the original audio or audio-visual work required to generate a time-scale expanded leaders (from TSLDD 5600); (d) the speed factor for time-scale compression (from TSLDD 5600); and (e) the speed factor for time-scale expansion (from TSLDD 5600). TSMS 5400 produces as output (a) a time-scale compressed leader; and (b) a time-scale expanded leader. TSMS 5400 time-scale compresses (at the specified speed factor) the specified duration of the original work to produce the time-scale compressed leader. Similarly, TSMS 5400 time-scale expands (at the specified speed factor) the specified duration of the original work to produce the time-scale expanded leader. In a preferred embodiment of the present invention, the time-scale-compressed leader and the time-scale expanded leader are stored in Storage Device 5100.

Storage Device 5100 is a storage device of a type which is well known to those of ordinary skill in the art. Storage Device 5100 stores a representation (preferably a digital representation or any representation that can be converted to a digital representation in accordance with methods which are well known to those of ordinary skill in the art) of an audio or audio-visual work or data of interest to a user (such as a stream of stock quotes, market data, advertisements, and so forth) and Time-Scale Modified Leaders.

As shown in FIG. 12, Request Processor (RP) 5500 receives, as input, requests for data from clients connected via a network (for example, an Internet, WAN, LAN, or the like). In response, Request Processor 5500 produces, as output, information identifying the client and the appropriate re-broadcast control information such as, for example, "request for data that is identified by an appropriate data identifier," "disconnect," and other messages that are used to obtain data from embodiment 5000. It should be clear to those of ordinary skill in the art, that such information identifying the client and appropriate re-broadcast control information may be obtained: (a) by dialogs between the client and Request Processor 4500 in accordance any one of many methods that are well known to those of ordinary skill in the art including, without limitation, by use of forms that are contained on web pages that are transmitted to the client over a network in accordance any one of the many methods that are well known to those of ordinary skill in the art. Output from RP 5500 is applied as input to Stream Assigment System (SAS) 5550.

As shown in FIG. 12, SAS 5550 receives, as input: (a) information from RP 5500; (b) leader-offset-stream information (described in detail below) from TSCL Streamer 5210; (c) leader-offset-stream information (described in detail below) from TSEL Streamer 5220; and (d) information (described in detail below) from LRBID 5710. SAS 5550 produces, as output, control information which is received by Multicaster 5300, TSCL Multicaster 5310, and TSEL Multicaster 5320. In accordance with this embodiment of the present invention, SAS 5550 first determines a temporally closest leader-offset-stream by computing distances, forward and backward, in time from the arrival time of a client's request to view an audio or audio-visual work, to the previous Time-Scale Modified Leader-offset-stream start time and the next Time-Scale Modified Leader-offset-stream start time, and choosing the smaller of the two as the temporally closest leader-offset-stream. This can be performed by either of two methods: (a) by monitoring information output from TSCL Streamer 5210 and TSEL Streamer 5220 or (b) by computing the start times for the leaders from information provided by LRBID 5710. In accordance with this embodiment of the present invention, SAS 5550 then produces, as output, information that directs either TSCL Multicaster 5310 or TSEL Multicaster 5320 to add the requesting client to the list of destinations for the appropriate Time-Scale Modified Leader offset stream segments being re-broadcast. SAS 5550 also sends information to Multicaster 5300 and either TSCL Multicaster 5310 or TSEL Multicaster 5320 which information conveys client identification and control information and the "intercept-time" for the corresponding Time-Scale Modified Leader offset stream to an offset stream of the original audio or audio-visual work. In response to the intercept information, TSCL Multicaster 5310 and TSEL Multicaster 5320 note the intercept time and schedule the deletion of the requesting client from the list of multicast recipients of that TSM Leader offset stream after the intercept time. Additionally, and in response to the intercept information, Multicaster 5300 notes the intercept time and schedules the addition of the requesting client to the list of multicast recipients of that offset stream after the intercept time.

As shown in FIG. 12, Time-Scale Expanded Leader Streamer 5220 receives, as input: (a) a code (for example, a number) which represents a desired Leader Re-broadcast Interval ("LRBI") from Leader Re-broadcast Interval Determiner 5710; (b) a code (for example, a number) which represents a desired number of Time-Division Multiplexed (TDM) channels for the Time-Scale Expanded Leader from Leader Re-broadcast Interval Determiner 5710; (c) a code (for example, a number) which represents the duration of the leader being re-broadcast from Leader Re-broadcast Interval Determiner 5710 (alternatively, this information could have come directly from TSLDD 5600); (d) the start times of the re-broadcast offset streams of the original audio or audio-visual work from Leader Re-broadcast Interval Determiner 5710; and (e) data for the audio or audio-visual work from Storage Device 5100. Time-Scale Expanded Leader Streamer 5220 produces, as output: (a) the Time-Division Multiplexed composite signal of leader segments in a manner similar to that described above for Work Streamer 4200 (applied as input to TSEL Multicaster 5320) and (b) a stream of information giving the playback position and time-offset for each time-offset re-broadcast stream of the Time-Scale Expanded Leader (applied as input to SAS 5550).

As shown in FIG. 12, Time-Scale Compressed Leader Streamer 5210 receives, as input: (a) a code (for example, a number) which represents a desired Leader Re-broadcast Interval (LRBI) from Leader Re-broadcast Interval Determiner 5710; (b) a code (for example, a number) which represents a desired number of Time-Division Multiplexed (TDM) channels for the Time-Scale Compressed Leader from Leader Re-broadcast Interval Determiner 5710; (c) a code (for example, a number) which represents the duration of the leader being re-broadcast from Leader Re-broadcast Interval Determiner 5710 (alternatively, this information could have come directly from TSLDD 5600); (d) the start times of the re-broadcast offset streams of the original audio or audio-visual work from Leader Re-broadcast Interval Determiner 5710; and (e) data for the audio or audio-visual work from Storage Device 5100. Time-Scale Compressed Leader Streamer 5210 produces, as output: (a) the Time-Division Multiplexed composite signal of leader segments in a manner similar to that described above for Work Streamer 4200 (applied as input to TSCL Multicaster 5310) and (b) a stream of information giving the playback position and time-offset for each time-offset re-broadcast stream of the Time-Scale Compressed Leader (applied as input to SAS 5550).

As shown in FIG. 12, Leader Re-broadcast Interval Determiner (LRBID) 5710 receives, as input: (a) a code (for example, a number) which represents the duration of the time-scale compressed and time-scale expanded leaders from TSLDD 5600; (b) a code (for example, a number) which represents the number of leader re-broadcast offset channels Re-broadcast Interval Determiner 5700; and (c) a code (for example, a number) which represents the RBI from RBID 5700. LRBID 5710 produces, as output, data which represents the duration of the Leader Re-broadcast Interval ("LRBI") (applied as input to TSCL Streamer 5210 and TSEL Streamer 5220). Leader Re-broadcast Interval Determiner 5710 computes the LRBI by applying the following formula:

$$\text{LRBI} = \text{RBI of audio or audio-visual work}/(\text{No. of leader re-broadcast offset channels}) \quad (10)$$

Note that the greater the number of leader re-broadcast offset channels, the shorter the LRBI, and the less time a requesting client must wait to begin receiving media data from embodiment 5000.

As shown in FIG. 12, TSCL Multicaster 5310 receives, as input: (a) a composite signal from TSCL Streamer 5210 and (b) client information (for example, control and destination) from SAS 5550. Likewise, as shown in FIG. 12, TSEL Multicaster 5320 receives, as input: (a) a composite signal from TSEL Streamer 5220 and (b) client information (for example, control and destination) from SAS 5550. Then, in accordance with the present invention, TSCL Multicaster 5310 and TSEL Multicaster 5320 produce, as output, data (for example, message packets) directed toward particular clients for re-broadcast on a network such as the Internet, WAN, LAN, etc. In accordance with the present invention, TSCL Multicaster 5310 and TSEL Multicaster 5320 each manages a list of all clients that should receive data from particular portions of the TDM composite signal in accordance with any one of a number of methods which are well known to those of ordinary skill in the art. Then, whenever the particular portion of data in the TDM composite signal is received from TSCL Streamer 5210 and TSEL Streamer 5220, respectively, TSCL Multicaster 5310 and TSEL Multicaster 5320, respectively, sends the particular portion of data to all clients (recipients) in the list who are to receive the particular portion of data (also known as multicasting). Many methods for broadcasting a portion of data from a data stream (for example, a Time-Division Multiplexed composite signal) to multiple recipients are well known to those of ordinary skill in the art. Control information from SAS 5550 is used in accordance with methods that are well known to those of ordinary skill in the art to modify the list of recipients, for example, to add a recipient, or to remove a recipient from the list of destinations when the recipient no longer desires to receive data from the server. Lastly, whenever the data stream for a leader merges with a re-broadcast offset stream, the client is removed from the list of recipients.

Embodiment 5000 has been described in detail above using separate components for ease of understanding the present invention, however, it should be clear to those of ordinary skill in the art that many of the components perform similar functions to their counterparts in embodiment 4000. Further, many of these corresponding components may be combined without loss of functionality. Still further, the intercept intervals in embodiment 5000 of the present invention follow a regular and periodic pattern which advantageously simplifies calculations of slope or playback rate and can be easily implemented using standard techniques such as lookup tables, count-down timers, and the like, all of which are well known to those of ordinary skill in the art.

Conversely, components of embodiment 5000 may exist in separate locations connected to one another via a network or any other communication means (where the use of the term means is used in the broadest sense possible).

Although FIG. 12 shows embodiment 5000 to be comprised of separate modules, in a preferred embodiment, the modules are embodied as software programs or modules which run on a general purpose computer such as, for example, a personal computer. It should be well known to one of ordinary skill in the art, in light of the detailed description above, how to implement these programs or modules in software.

Those skilled in the art will recognize that the foregoing description has been presented for the sake of illustration and description only. As such, it is not intended to be exhaustive or to limit the invention to the precise form disclosed.

Advantageously, embodiments of the present invention may be used to distribute Movies, Documentaries, or other audio and/or audio-visual works electronically, such as, for example, pay-per-view programs, video rental and the like. For example, although the distribution was described using networks, it should be understood that the term network is used in the broadest sense of the word and includes local distribution over cable, for example, a hotel distribution system, distribution over satellite, distribution over the public airwaves where terminals are used in accordance with well known methods to authorize client access. It should also be clear that Request Processor 5550 can include functionality (in accordance with methods that are well known to those of ordinary skill in the art) to charge money for receiving works such as movies, sporting events and so forth.

For example, those of ordinary skill in the art should readily understand that whenever the term "Internet" is used, the present invention also includes use with any non-deterministic delay network. As such, embodiments of the present invention include and relate to the world wide web, the Internet, intranets, local area networks ("LANs"), wide area networks ("WANs"), combinations of these transmission media, equivalents of these transmission media, and so forth.

In addition, it should be clear that embodiments of the present invention may be included as parts of search engines used to access streaming media such as, for example, audio or audio-visual works over the Internet.

In further addition, it should be understood that although embodiments of the present invention were described where the audio or audio-visual works were applied as input to playback systems, the present invention is not limited to the use of a playback system. It is within the spirit of the present invention that embodiments of the present invention include embodiments where the playback system is replaced by a distribution system, which distribution system is any device that can receive digital audio or audio-visual works and re-distribute them to one or more other systems that replay or redistribute audio or audio-visual works. In such embodiments, the playback system is replaced by any one of a number of distribution applications and systems which are well known to those of ordinary skill in the art that further distribute the audio or audio-visual work. It should be understood that the devices that ultimately receive the re-distributed data can be "dumb" devices that lack the ability to perform Time-Scale modification or "smart" devices that can perform Time-Scale Modification.

Although the present invention has been described using Time-Scale Modified Leaders to catch-up or slow-down to a re-broadcast offset stream of a media work played at a normal playback rate (slope=1), the present invention is not thusly limited. For example, further embodiments of the present invention can be utilized to enable clients to merge with time-scale compressed versions of a work (slope>1), time-scale expanded versions of a work (slope<1), or to enable clients to migrate from a time-scale modified version of a work at one particular playback speed to a time-scale modified version of the same work with a different playback speed. In accordance with the present invention, this is accomplished by providing transitions from one data stream to another at specific intercept points, or by employing time-scale modified leaders to transition between versions of a work with different playback speeds.

In accordance with the present invention, these embodiments are fabricated using embodiment 5000 described above, with a modification to SAS 5550. The modification enables SAS 5550 to compute the temporally closest stream with the requested time-scale (i.e., playback-rate) requested by the client at any point during playback.

Figure 13:
FIG. 13 shows a graph of location (offset from an origin) in normal and Time-Scale Modified versions of offset re-broadcasts of an audio or audio-visual work versus time on the horizontal axis.

FIG. 13 shows a graph of location (offset from an origin) in normal and Time-Scale Modified versions of offset re-broadcasts of an audio or audio-visual work versus time on the horizontal axis. As shown in FIG. 13, nine (9) offset data streams are being re-broadcast. Three, (13010, 13110, 13210), correspond to re-broadcast of the work with normal playback rate (slope=1.0); three, (13020, 13120, 13220), correspond to re-broadcast of the work with time-scale compression by a factor of 2 (slope=2.0); and three, (13005, 13105, 13205), correspond to re-broadcast of the work with time-scale expansion by a factor of 2 (slope=1/2). As further shown in FIG. 13, at each re-broadcast interval, three (3) stream broadcasts are initiated (compressed, normal, expanded) and that these offset data streams intercept one another at regular intervals where the lines cross (lines intersect when the playback locations and playback times are equal). Clients wishing to view or listen to a work at a different rate can make a seamless transition to the new rate at points of intersection because the playback locations at the intersections are identical in each of the streams. As still further shown in FIG. 13, transition leader 13001 (normal playback rate, slope=1) is shown to demonstrate a transition from playback stream 13005 (one-half normal playback rate, slope=1/2) to playback stream 13020 (twice normal playback rate, slope=2.0). Additionally, a time-scale modified transition leader 13002 (twice normal playback rate, slope=2.0) is used to transition from playback stream 13105 (one-half normal playback rate, slope=1/2) to playback stream 13110 (normal playback rate, slope=1) at a time before the normal intersection with playback stream 13220. Embodiment 5000 can be used to generate the re-broadcasts and the time-scale modified leaders to enable the client to traverse the re-broadcast matrix shown in FIG. 13. In that case, client requests will be received by Request Processor 5500 and transmitted in the manner described above with respect to the description of embodiment 5000.

For purposes of clarity and ease of understanding the present invention, the foregoing detailed description has used constant time-scale modification factors, but the present invention is not thusly limited and includes the use of varying time-scale modification factors using the same method and apparatus described above. Thus, Time-Scale Modification may be varied with time without loss of generality. In this case, the duration and slope of such a continually varying Time-Scale Modified signal can be computed using any one of a number of formulae, including the following formula:

$$\text{Duration} = \text{previous duration} + (\text{time-interval} * \text{tsm\_factor}) \tag{11}$$

Although for clarity and ease of understanding the previous inventions have been described broadcasting a single work, it should be clear that embodiments of the present invention are not thusly limited and the inventive technique can be applied to multiple works existing in a single embodiment.

Another aspect of the present invention relates to the use of Presentation Rate Guidance Information ("PRGI") that is broadcast in conjunction with an audio or audio-visual work from a broadcast server to restrict, or direct, playback rates at a client device receiving the audio or audio-visual work. Embodiments of this aspect of the present invention can be used in a variety of ways. For example, a public service announcement regarding emergency information, safety information, and the like may be missed if the user is listening at a very fast rate (learning impaired and hearing impaired individuals may wish to have important public service or emergency broadcasts played at playback rates below the normal playback rate to aid in comprehension). Since these messages may be of vital importance, a need exists to restrict or direct the playback rate for the client apparatus in a client-server system and/or broadcaster-recipient system that supports Time-Scale Modification, and/or to notify the client apparatus or recipient device of the importance of these messages.

In addition to a need for controlling playback rate relating, for example, to public safety, embodiments of this aspect of the present invention can be utilized to provide different delivery times for specific types of content, such as commercial advertisements, station identification, violence, nudity, adult language, program schedule information, and program information pertaining to audience suitability or content. Embodiments of the present invention can be utilized by broadcasters to regulate playback of broadcast media works so that, for example: (a) predetermined portions of the media work must be viewed at a predetermined rate, or skipped altogether, or (b) predetermined portions of the media work may be viewed at alternative playback rates that are selected by: (i) the user interactively, (ii) by a device programmed by the user (for example, such a device can form a part of a TSM Control Decoder which is described in detail below), or (iii) a device programmed by the broadcaster which may exist in the client apparatus (for example, such a device can form a part of the TSM Control Decoder which is described in detail below) or elsewhere. For example, such embodiments of the present invention enable broadcasters to regulate which commercial advertisements must be viewed at normal playback rates and which commercials may be viewed at alternative (generally faster) playback rates. Additionally, as a further example, embodiments of the present invention enable broadcasters to require that playback rates be increased for violent portions of a media work if a recipient device receiving the work is configured for "general audience viewing" rather than for "adult audience viewing." In accordance with the present invention, such embodiments can be used to restrict or limit the duration of predetermined adult scenes or language, the durations of which provide a metric that is often used in rating movies as being suitable for particular audiences.

PRGI is information that is used to communicate a playback rate for an entire media work or one or more specific portions of the media work. In particular, a media work may comprise an audio or audio-visual work. In further particular, the entire work, or portions of the work, may be identified by location information contained in the PRGI. Additionally the playback rate may be derived from information contained in the PRGI, which information can be interpreted to provide a playback rate and to identify a portion of the work by: (i) the user interactively, (ii) by a device programmed by the user, or (iii) a device programmed by the broadcaster which may exist in the client apparatus or elsewhere.

PRGI can be comprised of one or more of the following types of information (without limitation): (a) "presentation rate information," (b) "work targeting information," (c) "presentation rate insistence information," (d) "media work content information," (e) "presentation rate rule information," and (f) "time-stamp information."

In the simplest form, PRGI comprises "presentation rate information." The "presentation rate information" may comprise a single value, for example, a number, representing a playback rate which should take effect immediately upon receipt. Additionally, the "presentation rate information" may comprise a single value, for example a number, representing an increment, decrement, or scale factor that is applied to the current playback rate and which should take effect immediately upon receipt.

In further addition, PRGI may comprise "presentation rate information" and "work targeting information." In accordance with the present invention, the "work targeting information" may comprise information which identifies an entire work, or portions of the work. For example, the "work targeting information" may comprise a title of a work and time values (for example, referenced from the origin of the specified work), which time values identify one or more portions of the work. Additionally, the "work targeting information" may comprise numeric values which refer to sample counts, timing-marks, segues (i.e., scene changes), or other identifiers which identify segments or portions of the work. In further addition, the "work targeting information" may comprise absolute or wall-clock time values.

In further addition, PRGI may comprise: (a) "presentation rate information" and "presentation rate insistence information"; or (b) "presentation rate information" and "work targeting information" and "presentation rate insistence information." In accordance with the present invention, the "presentation rate insistence information" may comprise information which specifies the importance of utilizing the "presentation rate information" contained in the PRGI. For example, the "presentation rate insistence information" may be comprised of codes that indicate distinct levels such as, for example, "mandatory," "strongly-encouraged," "suggested," and "optional." Alternatively, the "presentation rate insistence information" may be comprised of a number on a standard scale known to all recipient devices that make use of this aspect of the present invention. In still another alternative, the "presentation rate insistence information" may be comprised of a single value, for example a number, representing an increment, decrement, or scale factor that is applied to the current insistence level and which should take effect immediately upon receipt. In accordance with this aspect of the present invention, a TSM Rate Determiner (which forms a portion of a device that receives the media broadcast and which will be described in detail below), interprets the "presentation rate information" transmitted from the media broadcaster in light of the "presentation rate insistence information" that is transmitted therewith. Further embodiments of the present invention do not require the use of "presentation rate insistence information." However, if insistence information is utilized, recipient devices may derive different playback rates from identical "presentation rate information" when that "presentation rate information" is paired with different "presentation rate insistence information."

In still further addition the PRGI may comprise: (a) "media work content information" or (b) "media work content information" and "work targeting information" from which playback rate information can be derived. The "media work content information" may take the form of codes which are processed using look-up tables, rules, algorithms or the like by: (a) the user interactively, (b) by a device programmed by the user, or (c) a device programmed by the broadcaster which may exist in the client apparatus or elsewhere; to obtain a playback rate for a portion of the specified work. The playback rates obtained may reflect the user's interest in portions of the work by, for example, using the techniques described in U.S. patent application entitled "Method and Apparatus for Generation of Listener Interest Filtered works, Ser. No. 09/169,031 filed Oct. 9, 1998, which patent application has the same inventor as the present application and is incorporated by reference herein.

In still further addition, the PRGI may comprise "presentation rate rule information" and any one or more of the following: "presentation rate information"; "work targeting information"; "presentation rate insistence information"; "media work content information"; and "time-stamp information". In accordance with the present invention, the "presentation rate rule information" comprises information which is used to process PRGI received in the future to obtain playback rates for portions of the media work being received by the recipient device. In some embodiments of this aspect of the present invention, this "presentation rate rule information" is stored in the form of look-up tables, processor memory, or data structures on the recipient device. The look-up tables, rules and/or algorithms that process predetermined codes and/or content information that are transmitted at the time of broadcast of the media work, can be broadcast at or before the time of broadcast of the media work. Thus, the "presentation rate rule information" can be "pre-loaded" and later used in conjunction with the recipient device's configuration information, user input, and future PRGI to obtain PRGI in another form. For example, "presentation rate rule information" can be sent at a specific hour each day, or between programs, to configure the client device. Once in place on the recipient device, the rule information may be used to process PRGI such as, for example, "media work content information," "presentation rate information," "work targeting information," or "presentation rate insistence information" that are received in the future to obtain different PRGI in the form of any combination of "presentation rate information," "work targeting information," or "presentation rate insistence information" for use by the recipient device. It should be understood that the term "presentation rate rule information" encompasses control commands necessary to change recipient device configuration data and to effectuate changes to the recipient device that are required to load and process new rules.

The "time-stamp information" can be used to insure that PRGI information, for example, "presentation rate insistence information," is utilized in a logical manner in light of the time of presentation. Thus, in accordance with the present invention: (a) client devices; (b) devices programmed by the user; or (c) a device programmed by the broadcaster which may exist in the client apparatus (or elsewhere); may ignore or alter certain aspects of the PRGI in light of the "time-stamp information" and the time of presentation. For example, client devices receiving PRGI information may choose to ignore "playback rate insistence information" if the "time-stamp information" indicates that the PRGI was received, for example, four (4) days ago. By ignoring the "playback rate insistence information" for time sensitive material in the media work, for example, advertisements for a sale which takes place on a certain date, users would be allowed to fast-forward through material in the media work which is no longer relevant at the time of viewing. Thus broadcasters or content creators may choose the duration of time for which the PRGI information sent to client devices will have effect. For example, the "time-stamp information" may consist of an expiration date for the effectiveness of the "playback rate insistence information." This allows material of a time sensitive nature to be presented with a restricted presentation rate during presentations of the media work which occur before the expiration date contained in the "time-stamp information." If the presentation of a media work occurs after the expiration date contained in the "time-stamp information," the outdated "playback rate insistence information" may be ignored, overridden, or altered to allow users to skip or fast-forward through that portion of the media work.

Note that many forms of the PRGI described above may be stored in a manner similar to that used for storing media works. Thus broadcasts of media works and accompanying PRGI may be stored and retrieved for later viewing of the works while still utilizing the information in the stored PRGI which accompanied the work during receipt of the broadcast.

Additionally, the PRGI may be comprised of multiple instances of different components or combinations of components described above. For example, the PRGI may consist of multiple playback rates that are appropriate for different audiences, for example, three playback rates may be broadcast; one for children, one for teenagers, and one for adults. Recipient devices may select the playback rate from the PRGI broadcast which corresponds to the configuration of the recipient device.

In accordance with the present invention, the PRGI information is received, processed, and, possibly, altered by one or more modules of the recipient device using look-up tables, rules, algorithms or the like, which one or more modules include: (a) user interaction, (ii) a device programmed by the user, or (iii) a device programmed by the broadcaster which may exist in the recipient apparatus or elsewhere. Each module in the recipient device may alter or transform the PRGI from one representation to another representation for use by other modules in the client device. For example, PRGI comprising "presentation rate information," "work targeting information," "presentation rate insistence information," and "time-stamp information" may be processed by a module that is programmed by the broadcaster and which resides in the client device to provide PRGI comprising "presentation rate information," "work targeting information," and "presentation rate insistence information" in which one or more of these values has been modified. The PRGI output from the module programmed by the broadcaster ("broadcaster-programmed-apparatus") may then be applied as input to a module that is programmed by the user ("user-programmed-apparatus") and which resides in the recipient device. The user-programmed-apparatus may then alter one or more components of the PRGI it receives as input and produce, as output, a modified PRGI comprising "presentation rate information," and "work targeting information" that is applied as input to a Time-Scale Modification System.

In accordance with this aspect of the present invention, PRGI used to restrict, or direct, playback rates at the client device is sent in either of two modes. The PRGI may be sent "in-band" (for example, occurring within the signal being transmitted, for example, as a specific frequency tone in the media work or as data codes within a header of a data packet) or it may be sent "out-of-band" (for example, occurring within a data packet associated with, but not comprising, media data).

Figure 14:
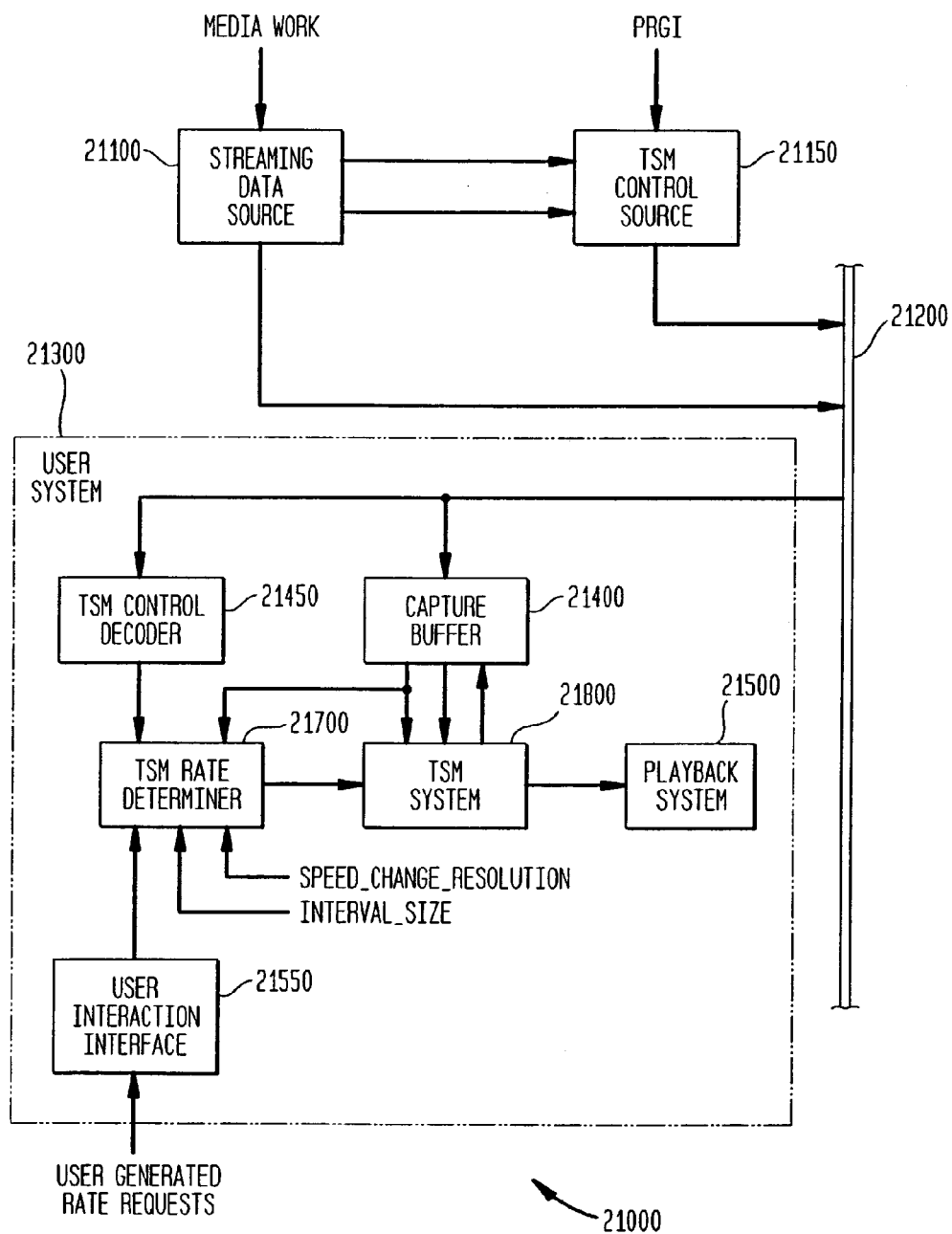
FIG. 14 shows a block diagram of embodiment 21000 of the present invention which transmits information relating to playback rate and/or content of media data in an "out-of-band" mode to clients receiving the media data.

FIG. 14 shows a block diagram of embodiment 21000 of the present invention which transmits PRGI in an "out-of-band" mode to client devices receiving the media data.

As shown in FIG. 14, Streaming Data Source 21100 receives, as input, information containing a representation of a media work to be broadcast. Streaming Data Source 21100 provides, as output: (a) data representing the media work through Network 21200 (Network 21200 is a network in the broadest sense described above); (b) information indicating a predetermined portion, or predetermined content, of the media work or media works being transmitted (applied as input to TSM Control Source 21150); and (c) client device identifier information for client devices that will have playback rates restricted, including, without limitation, a setting to indicate all broadcast client devices (applied as input to TSM Control Source 21150). There are many methods which are well known to those of ordinary skill in the art for fabricating Streaming Data Source 21100, for example, one or more of the embodiments described above. Note that all or some components of embodiment 21000 may exist in separate locations, which components are connected to one another via a network or any other communication means (where the use of the term means is used in the broadest sense possible). Streaming Data Source 21100 itself may be a component of a broadcast system, or it may be a component of any of a number of devices which provide as output a media work, for example a television transmitter, radio transmitter, signal repeater, or the like. Those of ordinary skill in the art should appreciate that, although this aspect of the present invention is being described in terms of transmission of streaming data over a network, the present invention is not thusly limited. In fact, in its broadest sense, this aspect of the present invention relates to all forms of transmission of information that are broadcast or sent over all forms of communication. As such, for sake of understanding the scope, embodiments of this aspect of the present invention include transmission of media over a cable network in a motel, transmission over a satellite network, broadcast over the Internet, broadcast over television networks, television broadcasts over airways, streaming media, pre-recorded storage media such as CD-ROM, Video Cassette Tape, and so forth.

As further shown in FIG. 14, TSM Control Source 21150 receives, as input: (a) information indicating a predetermined portion, or predetermined content, of the media work or media works being transmitted (from Streaming Data Source 21100); (b) client device identifier information for client devices that will have playback rates restricted, including, without limitation, a setting to indicate all broadcast client devices (from Streaming Data Source 21100); and (c) PRGI from broadcast system operators, content-providers, directors, editors, or others. In accordance with this embodiment of the present invention, TSM Control Source 21150 combines the information indicating a predetermined portion, or predetermined content, of the media work or media works being transmitted with the input PRGI to form an output PRGI and transmits the output PRGI over Network 21200 to all identified client devices (for example, predetermined groups of client devices) that will have playback rates directed for at least portions of media work data received from Streaming Data Source 21100. In some embodiments of the present invention, the information indicating a predetermined portion, or predetermined content, of the media work or media works being transmitted may already be contained within the PRGI input to TSM Control Source 21150. In the preferred embodiment of this aspect of the present invention, the output PRGI is sent by multicasting as has been described in detail above. As discussed in detail above, in further embodiments of the present invention, there is no need to provide to TSM Control Source 21150 information that indicates predetermined portions of the media work since, in such embodiments, a playback rate received as input may apply to the entire work. Additionally, if the PRGI is based on content information of the media work, then the recipient device infers the "work targeting information" from the corresponding content information using techniques described in U.S. patent application entitled "Method and Apparatus for Generation of Listener Interest Filtered works, Ser. No. 09/169,031 filed Oct. 9, 1998, which patent application has the same inventor as the present application and is incorporated by reference herein.

Although FIG. 14 shows the media data and the PRGI being transmitted over the same network, i.e., Network 21200, the present invention is not thusly limited. In fact, the present invention includes embodiments where the media data and PRGI are transmitted over different communications paths. Further, the transmission of the PRGI need not be coordinated with transmission of the media data as described in detail above. In further embodiments of the present invention, the PRGI is transmitted prior to transmission of the media data and includes "work targeting information" that enables the client device to coordinate the use of the PRGI with the media data. For example, in accordance with such further embodiments, the "work targeting information" includes, without limitation, times and/or time intervals in the media work that are targeted for use in restricting playback rates. In addition, such "work targeting information" may further include media work identification information that enables the recipient device to use and/or re-use the "work targeting information" and the PRGI with the identified media data any number of times. As should be clear to those of ordinary skill in the art, such "work targeting information" and media data identification information may be input to TSM Control Source 21150 as a part of the PRGI or one or more of them may be input to TSM Control Source 21150 in accordance with any number of methods that are well known to those of ordinary skill in the art by system operators, or by transmission from a computer, and so forth. Further, all of the information may be combined to form the PRGI output from TSM Control Source 21150 in accordance with any one of the many methods that are well known to those of ordinary skill in the art.

As shown in FIG. 14, User System 21300 accesses Network 21200 and receives information containing media data and the PRGI from Streaming Data Source 21100 and TSM Control Source 21150, respectively, via Network 21200. In the preferred embodiment, User System 21300 includes a distribution apparatus (not shown) which is well known to those of ordinary skill in the art that receives and routes data and information from Network 21200 using networking protocols and data packet identification information that are well known to those of ordinary skill in the art. For ease of understanding the present invention, this distribution apparatus is not shown in FIG. 14. For embodiments of the present invention that are implemented on general purpose computers, such as personal computers, and the like, this distribution apparatus manages the flow of information from a network, for example, the Internet, to various programs requesting data.

As further shown in FIG. 14, Capture Buffer 21400 receives the following, as input: (a) media data input from Network 21200; (b) optional requests for information about the amount of data stored therein (for example, from a Capture Buffer Monitor of the type which is described above in detail; this is not shown again here for the sake of clarity and for the sake of ease of understanding this aspect of the present invention); and (c) requests for media stream data from TSM System 21800. In response, Capture Buffer 21400 produces the following, as output: (a) a stream of data representing portions of the media work (applied as input to TSM System 21800); (b) a stream of location information used to identify the position in the stream of data (applied as input to TSM System 21800 and possibly TSM Rate Determiner 21700); and (c) an optional indication of the amount of data stored therein (applied as input to the optional Capture Buffer Monitor; not shown again here for the sake of clarity and for the sake of ease of understanding this aspect of the present invention). It should be well known to those of ordinary skill in the art that Capture Buffer 21400 may include a digital storage device. There are many methods well known to those of ordinary skill in the art for utilizing digital storage devices such as, for example, a "hard disk drive," to store and retrieve general purpose data and there exist many commercially available apparatus which are well known to those of ordinary skill in the art for use as a digital storage device such as, for example, a CD-ROM, a digital tape, a magnetic disk, and so forth.

As still further shown in FIG. 14, TSM Control Decoder 21450 receives, as input, the PRGI from Network 21200 (as discussed above, TSM Control Decoder 21450 can also receive all or a portion of the PRGI from a different communication channel as well). TSM Control Decoder 21450 processes the input PRGI information to obtain PRGI information in a form which can be utilized by TSM Rate Determiner 22700. Thus, TSM Control Decoder 21450 may augment PRGI data received by the application of rules, algorithms, and look-up tables to obtain PRGI data for output. Additionally, TSM Control Decoder 21450 may reduce or eliminate components of the PRGI data received to obtain PRGI data in a format which can be utilized by TSM Rate Determiner 21700. In accordance with one embodiment of the present invention, the broadcaster sends to TSM Control Decoder 21450 PRGI that comprises "presentation rate rule information," which rules state: "rate information output during the first two or three occurrences of a commercial advertisement occurring in a series of media works received by the client device are 'unmodifiable'." This will prevent users from speeding through commercials they have not seen repeatedly. Additionally, or alternatively, the rules may dictate that playback rate information transmitted from the broadcaster for commercials that have aired less than a predetermined number of times or within a predetermined time interval, for example, two (2) days, be specified as "unmodifiable."

Figure 16:
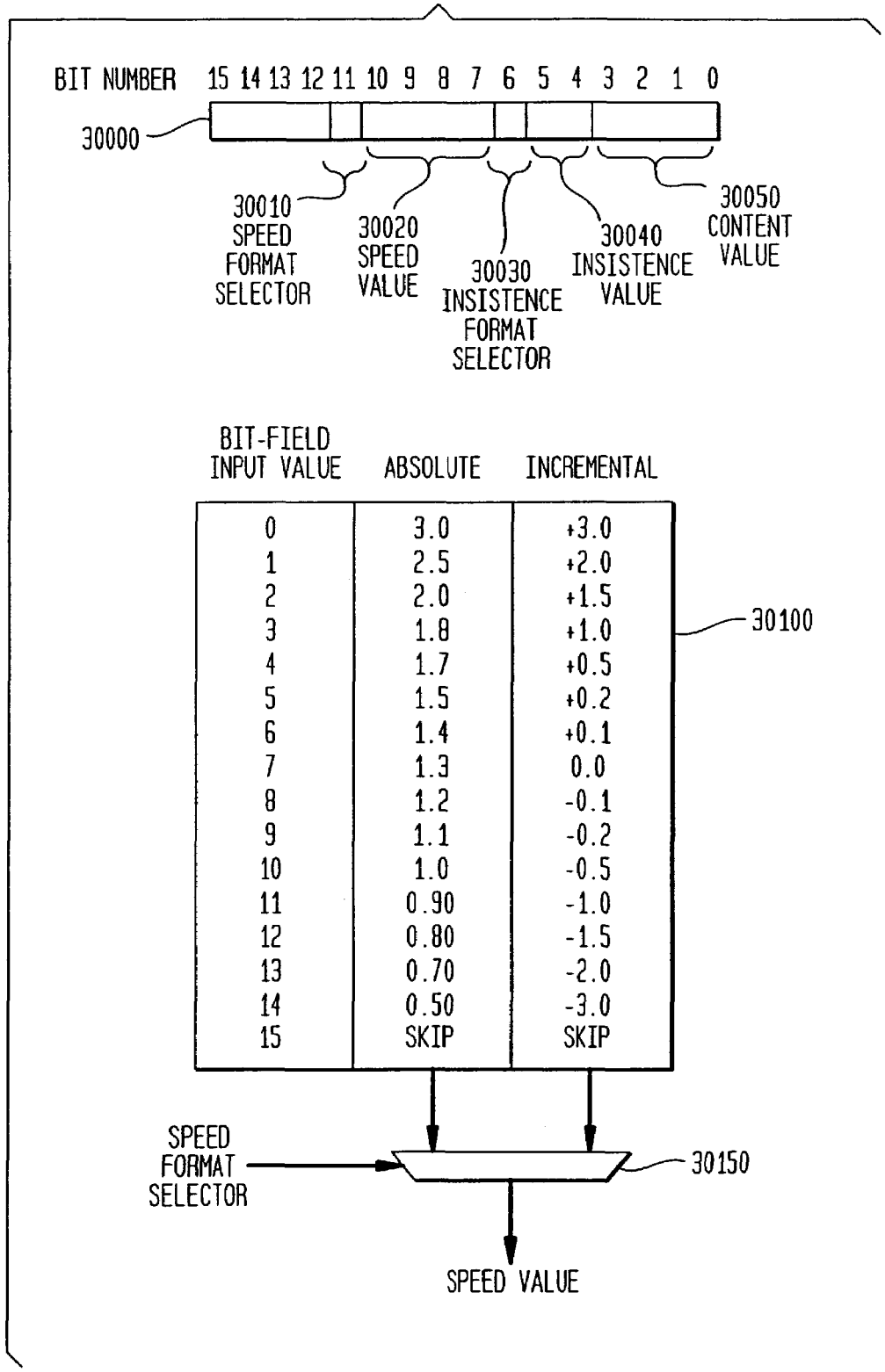
FIG. 16 shows an example of a Presentation Rate Guidance Information signal received by the TSM Control Decoder of FIG. 14 and how it is used by embodiment 21000 of FIG. 14 to determine playback rates of at least portions of a media work.

FIG. 16 shows an example of PRGI data 30000 received by TSM Control Decoder 21450 of FIG. 14 and how PRGI data 30000 is used to determine playback rates of at least portions of the media work. As further shown in conjunction with FIG. 16, information contained in the PRGI data 30000 may be processed in numerous ways to obtain an appropriate playback rate for the presentation of the media work received. In accordance with an embodiment of this aspect of the present invention, PRGI data 30000 comprises a single, 16-bit data word of information that contains values that are stored in binary format in various bit-fields, which values are used to index look-up tables or rules in the following manner. As shown in FIG. 16, a 16-bit word of PRGI data 30000 is comprised of several bit-fields: (a) a 1-bit playback rate format selector field 30010; (b) a 4-bit playback rate field 30020; (c) a 1-bit insistence format selector field 30030; (d) a 3-bit insistence value field 30040; and (e) a 4-bit content value field 30050.

As further shown in FIG. 16, Playback Rate Look-Up Table 30100 comprises absolute playback rate values and incremental playback rate values, and is used to map values from the bit-fields of PRGI data 30000 to an absolute playback rate value and an incremental playback rate value. This type of look-up table is commonly stored in digital memory devices of a type that is well known to those of ordinary skill in the art. Further, the look-up table can be loaded by sending values to specific addresses of the memory device using any one of the many methods which are well known to those of ordinary skill in the art. A number stored in the playback rate value bit-field 30020 of PRGI data 30000 is used to index Playback Rate Look-Up Table 30100 and obtain two values which are applied as input to Playback Rate Format Selector 30150. Playback Rate Format Selector 30150 uses Playback Rate Format Selector field 30010 of PRGI data 30000 to select one of the two input values. The playback rate value thus obtained specifies an absolute playback rate value or an incremental playback rate value depending on the value contained in the Playback Rate Format Selector field 30010. Further, the playback rate values obtained for a given input code can be changed dynamically by altering the entries of Playback Rate Look-Up Table 30100 during operation, for example, by sending system control information in the PRGI to a specific address on User System 21300 to effectuate writing to a memory location on User System 21300.

FIG. 17 shows Content Look-Up Table 30200 to illustrate how embodiment 21000 uses content information to determine playback rates of at least portions of the media work. As shown in FIG. 17, Content Look-Up Table 30200 contains content information and is used to map values from the content value field 30050 of PRGI data 30000 (FIG. 16) to a content value. This type of look-up table is commonly stored in digital memory devices of a type that is well known to those of ordinary skill in the art. Further, the look-up table can be loaded by sending values to specific addresses of the memory device using any one of the many methods which are well known to those of ordinary skill in the art. A number stored in content value field 30050 of PRGI data 30000 is used to index Content Look-Up Table 30200 and obtain a content value that may include, for example, information about content, transitions, language or priority of the media work being received. Furthermore, the content values obtained for a given input code can be changed dynamically by altering the entries of Content Look-Up Table 30200 during operation, for example, by sending system control information to a specific address on User System 21300 to effectuate writing to a memory location on User System 21300. Thus, the number of content values capable of being output exceeds the number of entries in Content Look-Up Table 30200 when "in-progress" updates to the table are performed.

As shown in FIG. 17, Insistence Look-Up Table 30300 comprises insistence values, and it is used to map values from insistence format selector field 30030 of PRGI data 30000 (FIG. 16) to an absolute insistence value, or an incremental insistence value. This type of look-up table is commonly stored in digital memory devices of a type that is well-known to those of ordinary skill in the art. Further, it can be loaded by sending values to specific addresses of the memory device using any one of the many method which are well known to those of ordinary skill in the art. In some embodiments, the number stored in insistence format selector field 30030 of PRGI data 30000 is pre-pended to the number stored in insistence value field 30040 of PRGI data 30000 to form a new number which is used in conjunction with recipient device state information to index Insistence Look-Up Table 30300 and obtain either an absolute insistence value or an incremental insistence value. Further, the insistence values obtained for a given input code can be changed dynamically by altering the entries of the look-up table during operation, for example, by sending system control information to a specific address on User System 21300 to effectuate writing to a memory location on User System 21300.

For clarity and ease of understanding only three states have been shown in FIG. 17. However, method and apparatus fabricated in accordance with the present invention are not thusly limited, and one should appreciate that any number of states could be used to achieve different levels of granularity of service provided.

In one embodiment of the present invention, state values are obtained from User System 21300 and represent a level of service the user has purchased, or the feature set or model of User System 21300 purchased by the user. The state values are used to control the capabilities of User System 21300 during processing of the PRGI sent with a media broadcasted work. For example, and as shown in FIG. 17, "presentation rate insistence information" (for example, bit-field values of PRGI data 30000) may be represented in the following manner: the number 3 represents "mandatory," the number 2 represents "strongly-encouraged," the number 1 represents "suggested," and the number 0 representing "optional." Using this representation, User System 213000 allows playback rate values with accompanying insistence values less than 3 to be overridden by user input using apparatus acting on behalf of the user's preferences, and the like. Playback rate values which have an accompanying insistence value of 3 would not be alterable either by user input, or apparatus in User System 21300 since these values are deemed mandatory. For playback rate values with accompanying insistence values less than 3, the ability to change the speed value by user input, apparatus acting on behalf of the user's preferences and the like may be regulated by the state value obtained from User System 21300. Users may pay to change the state of their User Systems and thus obtain the ability to alter or override the suggested guidance information provided by TSM Control Source 21150.

Although embodiments of the present invention have been described using simple states which are determined by the payment of a fee or a feature set of a particular configuration of User System 21300, the present invention is not thusly limited. In fact, one should readily appreciate that the present invention includes embodiments wherein complex algorithms or rules are employed to control the state of User System 21300. For example, User System 21300 may employ a time-base service in which the user of the recipient device must pay for the ability to override the guidance information provided by TSM Control Source for a fixed amount of time. Upon the expiration of a predetermined interval of time, in accordance with such an embodiment, the state of User System 21300 transitions to a different state (for example, at a lower level of lower service) and would disallow the feature's use until repayment.

Additionally, in accordance with further embodiments of the present invention, User System 21300 contains a counter or other apparatus (not shown for ease of understanding) that is well known to those of ordinary skill in the art which computes the number of times User System 21300 has overridden the guidance information received from TSM Control Source 21150. The per-use information provided is then used to implement any number of payment options, such as, for example and without limitation, per commercial, per-show, or per-minute fees for altering or overriding the PRGI received from TSM Control Source 21150. The per-use information may be combined with the content information received to allow users to alter the playback rate of certain types of content, for example, commercials or educational material, only after the material has been viewed a specific number of times on User System 21300.

It should be understood that although an exhaustive list of billing protocols and algorithms has not been provided for clarity and ease of understanding the present invention, the present invention encompasses all forms of algorithms which restrict and allow alteration of the PRGI broadcast in association with the media work. For example, broadcasters may provide User Systems of predetermined segments of broadcast recipients (which segments are based, for example, on geographic, economic, age, language, or other distinguishing characteristics), data ("speed credits") that may be used to selectively allow for overriding of PRGI for certain portions of the media works being broadcast. Thus, users residing in a rural geographical location may receive speed credits for use in speeding up the playback rate during all commercials with content values pertaining, for example, to "subway tokens in a distant city." Furthermore, users fluent in one language may be given speed credits to slow down commercials or programs which make use of another language. The speed credits may contain identifying values which would be compared to content values broadcast with PRGI to determine and/or modify the value of the output PRGI's "presentation rate insistence information." In further addition, speed credits may be comprised of information identifying particular types of media works, for example, commercials for automobiles and have a limited number of uses. These limited speed credits would then allow users to fast-forward through a fixed number of automobile commercials, or in another embodiment a fixed number of automobile commercials broadcast during particular broadcast times, for example, prime-time, late-night, and the like. The effect of broadcasting more automobile commercials than users would be allowed to view at increased playback rates would be to force users to contemplate their interest in each commercial before "spending" the speed credit. In this aspect of the present invention, users will naturally choose to watch commercials of interest at normal rates while accelerating the playback rate for commercials which do not interest them. The overall benefit of such a system to advertisers is that user would be exposed to more media content including advertisements per unit time than would be possible without the time-scale modification and users would hear the content of advertisements played at accelerated rates. Additionally, the benefit to users would be that they are allowed to accelerate the playback rate of uninteresting commercials.

In further addition, the broadcaster of the media work and PRGI may provide the ability to alter the PRGI during certain viewing times and to restrict the ability at other times, for example during "prime-time" viewing hours. The capability to restrict or allow playback rates other than the suggested playback rate broadcast with the media work is provided via use of different insistence levels that may specify "mandatory" or non-mandatory insistence levels depending on the broadcast time. The non-mandatory insistence levels may be subdivided further based on the states in the User Systems so that customers paying for premium service may be allowed to alter the broadcast playback rate while those paying for less service would be restricted.

Although the inventive technique and apparatus have been described using four (4) insistence levels, the present invention is not thusly limited and any number of insistence levels could be used.

As yet still further shown in FIG. 14, TSM Rate Determiner 21700 receives the following, as input: (a) a signal (from TSM Control Decoder 21450) that represents PRGI, for example a playback rate and work location and optionally, presentation rate insistence information; (b) user generated playback rate requests received from User Interaction Interface 21550; (c) a parameter designated Interval_Size; (d) a parameter designated Speed_Change_Resolution; and (e) work location information from either Capture Buffer 21400 or TSM System 21800. In response, TSM Rate Determiner 21700 produces, as output, a playback rate signal representing a TSM rate, or playback rate, which playback rate signal is applied as input to TSM System 21800. TSM Rate Determiner 21700 may pass user generated playback rate requests to its output (without modification), thereby enabling the user to control the playback rate. However, in accordance with the present invention, whenever TSM Rate Determiner 21700 receives PRGI, for example in the form of "presentation rate information" and "work targeting information", from TSM Control Decoder 21450, TSM Rate Determiner 21700 processes that information in light of the work location information received from TSM System 21800 to determine an appropriate playback rate to output to TSM System 21800. For example TSM Rate Determiner 21700 may receive a time-offset from the origin of work as a component of the PRGI received as input from TSM Control Decoder 21450 and compare the time-offset with a time-offset from TSM System 21800 to determine the appropriate time to update the output TSM Rate. Additionally, TSM Rate Determiner 21700 may utilize algorithms to process the input PRGI and obtain and output playback rate. For example, TSM Rate Determiner 21700 may override the user requested rate request if the information from TSM Control Decoder 21450 contains "presentation rate insistence information", for example, a predetermined code (signifying, for example, without limitation, that the media work being received is of critical importance to public safety). Additionally, TSM Rate Determiner 21700 may process the PRGI from TSM Control Decoder 21450 according to rule-sets or other algorithms specified by: (a) the user interactively, (b) a device programmed by the user, or (iii) a device programmed by the broadcaster which may exist in the client apparatus or elsewhere. For example, in accordance with rule-sets or algorithms input by the user using the user interaction interface apparatus in accordance with any one of many methods which are well known to those of ordinary skill in the art, User System 21300 can fast-forward through all commercial content in the media work being received and/or slow down for specific types of content, using techniques described in U.S. patent application entitled "Method and Apparatus for Generation of Listener Interest Filtered works, Ser. No. 09/169,031 filed Oct. 9, 1998, which patent application has the same inventor as the present application and is incorporated by reference herein.

In a preferred embodiment of the present invention, TSM Rate Determiner 21700 uses a parameter Interval_Size to segment the input digital data stream in Capture Buffer 21400 and to determine a single TSM rate for each segment of the input digital stream. Note the length of each segment is given by the value of the Interval_Size parameter. Further, TSM Rate Determiner 21700 uses a parameter Speed_Change_Resolution to determine appropriate TSM rates to pass to TSM System 21800. A desired TSM rate is converted to one of the quantized levels in a manner that is well known to those of ordinary skill in the art. This means that the TSM rate, or playback rate, can change only if the desired TSM rate changes by an amount that exceeds the difference between quantized levels, i.e., Speed_Change_Resolution. As a practical matter then, parameter Speed_Change_Resolution filters small changes in TSM rate, or playback rate. The parameters Interval_Size and Speed_Change_Resolution can be set as predetermined parameters for embodiment 21000 in accordance with methods which are well known to those of ordinary skill in the art or they can be entered and/or varied by receiving user input through the user interaction interface apparatus in accordance with methods which are well known to those of ordinary skill in the art. However, the manner in which these parameters are set and/or varied are not shown for ease of understanding the present invention.

Embodiments of TSM System 21800 and Playback System 21500 have been described in detail above.

As shown in FIG. 14, User Interaction Interface 21550 receives as input: User Generated Rate Requests from a user. User Interaction Interface 21550 produces as output: PRGI, for example, in the form of data codes which specify the absolute playback rate or incremental changes to the current playback rate, or any of the components of PRGI discussed above. User Interaction Interface 21550 uses apparatus which is fabricated in accordance with any one of many methods which are well known to those of ordinary skill in the art for collecting input from a user via a keyboard and screen, mouse, pointing device, or joystick.

Although FIG. 14 shows embodiment 21000 to be comprised of separate modules, in a preferred embodiment, the modules are embodied as software programs or modules which run on a general purpose computer such as, for example, a personal computer. It should be well known to one of ordinary skill in the art, in light of the detailed description above, how to implement these programs or modules in software.

Conversely, components of embodiment 21000 may exist in separate locations connected to one another via a network or any other communication means (where the use of the term means is used in the broadest sense possible).

Advantageously, in accordance with the present invention, the above-described PRGI can be used to control the playback rate during predetermined portions of the media work, for example, commercials or public safety announcements. Thus, a user may be prevented from fast forwarding through the commercials or public safety announcements. However, in an alternative embodiment, users may pay for the ability to automatically fast-forward through all commercial advertisements in an audio or audio-visual work being received. In such an alternative embodiment, a user interaction interface apparatus (fabricated in accordance with any one of the many methods which are well known to those ordinary skill in the art) receives user requests and charge information to effectuate the functionality of overriding broadcast PRGI, for example playback rate information, received by TSM Rate Determiner 21700. Such payment information is sent as predetermined codes which are recognized by TSM Rate Determiner 21700 in a manner that is well known to those of ordinary skill in the art and enable user determined playback rates to be used for playback.

In addition, it should be understood that although embodiment 21000 was described in the context of streaming media over a network, the term network is used in the broadest sense as described above and that this aspect of the present invention is not limited to broadcast of streaming media and includes broadcast of media in general.

Figure 15:
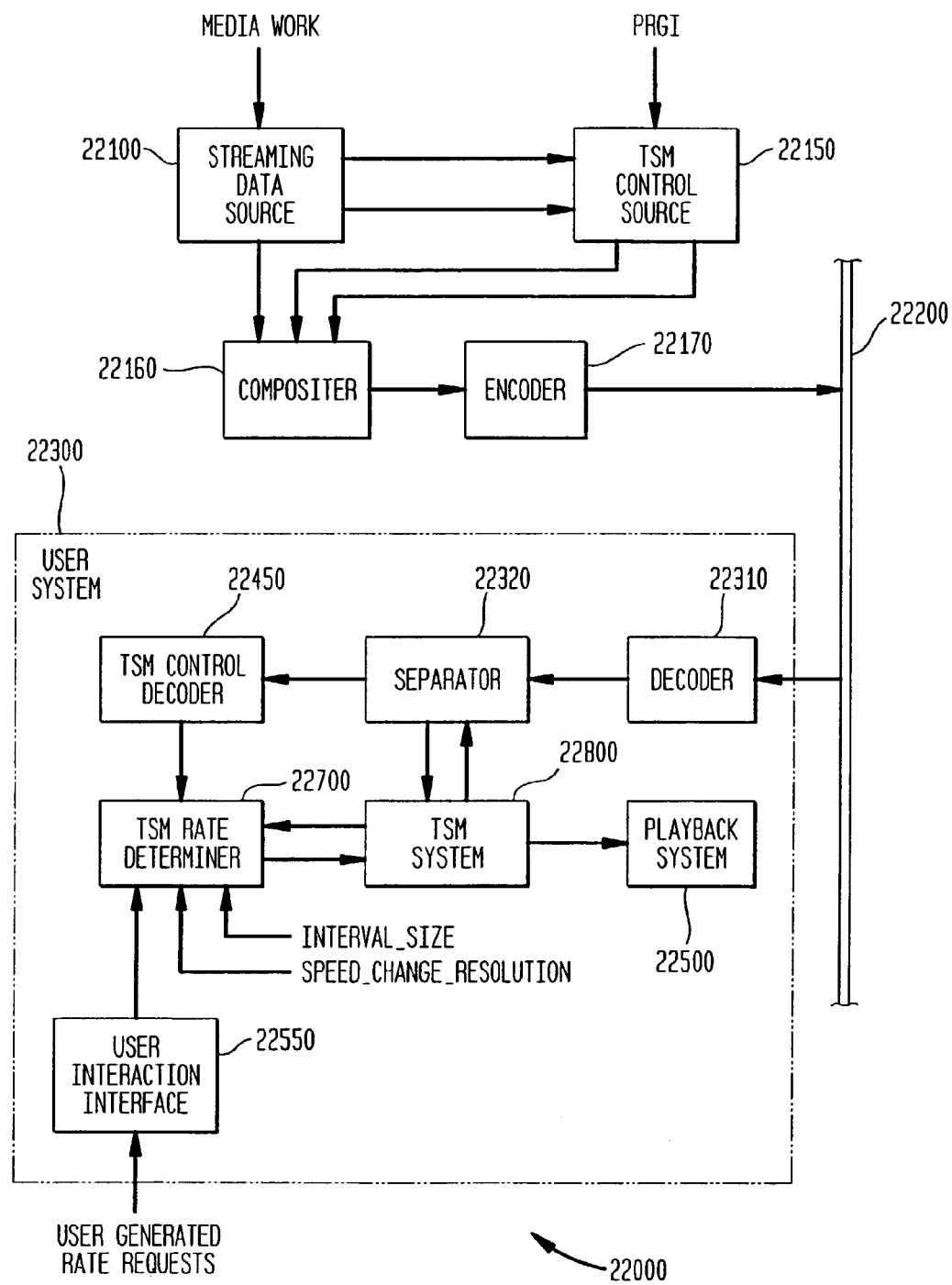
FIG. 15 shows a block diagram of embodiment 22000 of the present invention in which information relating to playback rate and/or content of media data being broadcast is transmitted in an "in-band" mode to clients.

FIG. 15 shows a block diagram of embodiment 22000 of the present invention in which PRGI being broadcast is transmitted in an "in-band" mode (i.e. embedded in the media work) to client devices.

As shown in FIG. 15, Streaming Data Source 22100 receives, as input, information containing a representation of a media work to be broadcast. Streaming Data Source 22100 provides, as output: (a) data representing the media work to Compositer 22160; (b) information indicating a predetermined portion, or predetermined content, of the media work or media works being transmitted (applied as input to TSM Control Source 22150); and (c) client device identifier information for client devices that will have playback rates restricted, including, without limitation, a setting to indicate all broadcast client devices (applied as input to TSM Control Source 22150). There are many methods which are well known to those of ordinary skill in the art for fabricating Streaming Data Source 22100, for example, one or more of the embodiments described above. Note that all or some components of embodiment 22000 may exist in separate locations, which components are connected to one another via a network or any other communication means (where the use of the term means is used in the broadest sense possible).

As further shown in FIG. 15, TSM Control Source 22150 receives, as input: (a) information indicating a predetermined portion, or predetermined content, of the media work or media works being transmitted (from Streaming Data Source 22100); (b) client device identifier information for client devices that will have playback rates restricted, including, without limitation, a setting to indicate all broadcast client devices (from Streaming Data Source 21100); and (c) PRGI from broadcast system operators, content-providers, directors, editors, or others. In accordance with this embodiment of the present invention, TSM Control Source 22150 produces, as output: (a) client device identifier information for client devices that will have playback rates restricted (applied as input to Compositer 22160) and (b) PRGI (applied as input to Compositer 22160). In accordance with this embodiment of the present invention, TSM Control Source 22150 combines the information indicating a predetermined portion, or predetermined content, of the media work or media works being transmitted with the input PRGI to form an output PRGI and transmits the output PRGI to Compositer 22160. In some embodiments of the present invention, the information indicating a predetermined portion, or predetermined content, of the media work or media works being transmitted may already be contained within the PRGI input to TSM Control Source 22150. As discussed in detail above, in further embodiments of the present invention, there is no need to provide information that indicates predetermined portions of the media work since, in such embodiments, a playback rate may apply to the entire work or to content specific portions thereof.

As still further shown in FIG. 15, Compositer 22160 receives, as input: (a) data representing the media work (from Streaming Data Source 22100); (b) client device identifier information for client devices that will have playback rates restricted (from TSM Control Source 22150); and (c) PRGI (from TSM Control Source 22150). Compositer 22160 provides, as output, a data signal which contains both the media work and PRGI (applied as input to Encoder 22170). In accordance with this embodiment of the present invention, Compositer 22160 embeds the PRGI by transforming it into any one of a number of signal representations that are well known to those of ordinary skill in the art to be compatible for use with well known apparatus that encodes and decodes the media work. In one embodiment, for example, short tones of a predetermined frequencies may be used. In another embodiment, for example, code data may be embedded in portions of the media work that are not presented to users, for example, during vertical blanking intervals such as those employed today by most television sets to provide closed-captioning information. In another embodiment, Compositer 22160 utilizes the client device identifier information input to determine whether or not to embed PRGI in the media work or in data packets or data transport layers which contain the media work. Additionally, Compositer 22160 may embed PRGI information in the media work or in data packets or data transport layers which contain the media work and selectively alter the value of a "valid" or "ignore" flag contained in the PRGI according to the client device identifier information. Thus, client devices specified would receive embedded PRGI with a valid flag, while others would receive PRGI with an ignore flag. It should be clear to those of ordinary skill in the art that Compositer 22160 may itself be a component of a broadcast system, or it may be a component of any of a number of devices which provide as output a media work, for example a television transmitter, radio transmitter, signal repeater, or the like.

As yet still further shown in FIG. 15, Encoder 22170 receives, as input, a data signal from Compositer 22160 and provides, as output, a representation of the input data signal which is transmitted via Network 22200 (Network 22200 is a network in the broadest sense described above) to client devices, for example, client devices that have requested the audio or audio visual work. Encoder 22170 uses any number of methods well known to those of ordinary skill in the art for transforming the incoming signal into a representation which requires less storage, and transmission bandwidth, and which can be used to reconstruct significantly the same signal.

In embodiments of the present invention that transmit data "in-band" by the addition of information into the data packet or transport layer used to carry the media information, the PRGI is not contained in the media work and thus can be added after the encoding of the media work by Encoder 22170. Thus it should be clear to those of ordinary skill in the art that the chain of components comprised of Compositer 22160, Encoder 22170, Network 22200, Decoder 22310 and Separator 22320 may be changed to Encoder 22170, Compositer 22160, Network 22200, Separator 22320, and Decoder 22310 due to the fact that the PRGI no longer needs to be merged with the media work and encoded before transmission over Network 22200. Instead the data representing the encoded media work is added to the PRGI and the two are packaged together before transmission.

As shown in FIG. 15, User System 22300 is connected to Network 22200 and receives information containing media data and PRGI from Compositer 22160 via Network 22200. In the preferred embodiment, User System 22300 includes a distribution apparatus (not shown) which is well known to those of ordinary skill in the art that receives and routes data and information from Network 22200 using networking protocols and data packet identification information that are well known to those of ordinary skill in the art. For the sake of clarity and ease of understanding the present invention, this apparatus is not shown in FIG. 15. For embodiments of the present invention that are implemented on general purpose computers, such as personal computers, and the like, this distribution apparatus manages the flow of information from a network, for example, the Internet, to various programs requesting data.

As further shown in FIG. 15, Decoder 22310 receives, as input, data from Network 22200. Decoder 22310 provides, as output, a data signal which is applied as input to Separator 22320. Decoder 22310 decodes the encoded data signal using any one of a number of methods which are well known to those of ordinary skill in the art to obtain an identical or substantially similar signal to the signal that was presented as input to Encoder 22170.

As still further shown in FIG. 15, Separator 22320 receives, as input, the data signal from Decoder 22310, and Separator 22320 provides, as output: (a) a data signal representing the media work (applied as input to TSM System); and (b) a data signal representing the PRGI (applied as input to TSM Control Decoder 22450). Separator 22320 uses any one of many methods that are well known to those of ordinary skill in the art for detecting, decoding, and removing an embedded signal from the media work. For example, a matched filter may be used to detect predetermined frequency tones present in the work. After detection, these tones may be removed, for example, by subtracting the predetermined tones from the original composite signal to create a signal without the predetermined tones. In addition, it should be clear to those of ordinary skill in the art that information not presented to the user may be left in the composite signal since it will not interfere with, or be detected during, presentation. For example, close captioning information is not visible during presentation unless specifically requested by the user.

In accordance with this embodiment of the present invention, TSM Control Decoder 22450, TSM Rate Determiner 22700, TSM System 22800, User Interaction Interface 22550, and Playback System 22500 are the same as the corresponding components described above with respect to embodiment 21000.

Although FIG. 15 shows embodiment 22000 to be comprised of separate modules, in a preferred embodiment, the modules are embodied as software programs or modules which run on a general purpose computer such as, for example, a personal computer. It should be well known to one of ordinary skill in the art, in light of the detailed description above, how to implement these programs or modules in software.

Conversely, components of embodiment 22000 may exist in separate locations connected to one another via a network or any other communication means (where the use of the term means is used in the broadest sense possible).

It should be clear that all of the capabilities discussed above with respect to embodiment 21000 (shown in FIG. 14) also apply to embodiment 22000 (shown in FIG. 15) and, as such, the discussion of such capabilities is incorporated herein by reference.

Although the detailed description used the terms playback rate and TSM rate, and the terms playback and playback apparatus, these terms should be understood to include any type of presentation rate (i.e., a rate of presentation of information) and any type of presentation apparatus. As such, these terms are to be understood as being used in the broadest sense. In addition, although the detailed description used the terms media, media work, media data, media broadcast, audio or audio-visual work, and information, these terms should be understood to refer to any type of information or data. As such, these terms are to be understood as being used in the broadest sense.

What is claimed is:

1. A method for presentating information received from a broadcaster by a client device, which client device utilizes presentation rates to present information at various presentation rates, and which method comprises steps of:

receiving broadcast information;

receiving guidance information relating to presentation of the broadcast information;

analyzing the guidance information and state values accessed by the client device to provide one or more presentation rates, which state values may be used to alter or override at least a portion of the guidance information; and presenting the information at the one or more presentation rates.

2. The method of claim 1 which further comprises a step of the user paying for predetermined values of the state values.

3. The method of claim 2 which further comprises a step of the user paying to change the state values.

4. The method of claim 1 which further comprises a step of the user paying for predetermined values of the state values, which predetermined values are effective for a predetermined period of time or for a predetermined number of presentations.

5. The method of claim 4 wherein after the predetermined period of time or the predetermined number of presentation, the state values change to a predetermined set of values.

6. The method of claim 5 wherein the predetermined set of values disable predetermined capabilities of the client device.

7. The method of claim 2 wherein the predetermined values enable user input to specify an enhanced presentation rate for commercials.

8. The method of claim 2 wherein the predetermined values enable user input to specify an enhanced presentation rate for information after the information has been presented a predetermined number of times.

9. The method of claim 2 which further comprises a step of providing speed credits for presenting predetermined information.

10. The method of claim 9 which further comprises a step of utilizing speed credits to purchases state values that enable a user to specify an enhanced presentation rate for predetermined information.

11. The method of claim 10 wherein the step of specifying an enhanced presentation rate includes enabling a user to fast forward through a predetermined number of commercials.

12. The method of claim 11 wherein the step of specifying includes enabling a user to fast forward through a predetermined number of commercials during particular time periods.

13. The method of claim 2 wherein the predetermined values disable predetermined capabilities of the client device during predetermined time periods.

14. The method of claim 4 wherein the predetermined period of time is one or more of per commercial, per show, and per minute.

15. A method for presenting broadcast information that comprises steps of:

receiving broadcast information;

receiving guidance information relating to presentation of the broadcast information;

paying for a capability to alter or override at least a portion of the guidance information;

receiving user input to alter or override at least some of the guidance information;

analyzing the guidance information, the capability, and the user input to provide one or more presentation rates; and presenting the information at the one or more presentation rates.

* * * * *